United States Patent
Davies et al.

(10) Patent No.: US 12,052,342 B2
(45) Date of Patent: Jul. 30, 2024

(54) MAPPING KEYS TO A BLOCKCHAIN OVERLAY NETWORK

(71) Applicant: nChain Licensing AG, Zug (CH)

(72) Inventors: Jack Davies, London (GB); Craig Steven Wright, London (GB)

(73) Assignee: nChain Licensing AG, Zug (CH)

(*) Notice: Subject to any disclaimer, the term of this patent is extended or adjusted under 35 U.S.C. 154(b) by 225 days.

(21) Appl. No.: 17/788,277

(22) PCT Filed: Aug. 24, 2020

(86) PCT No.: PCT/IB2020/057894
§ 371 (c)(1),
(2) Date: Jun. 22, 2022

(87) PCT Pub. No.: WO2021/130557
PCT Pub. Date: Jul. 1, 2021

(65) Prior Publication Data
US 2023/0046315 A1 Feb. 16, 2023

(30) Foreign Application Priority Data
Dec. 24, 2019 (GB) ...................... 1919295

(51) Int. Cl.
*H04L 9/08* (2006.01)
*H04L 9/00* (2022.01)

(52) U.S. Cl.
CPC .......... *H04L 9/0819* (2013.01); *H04L 9/0836* (2013.01); *H04L 9/0869* (2013.01); *H04L 9/50* (2022.05)

(58) Field of Classification Search
CPC ... H04L 9/0819; H04L 9/0836; H04L 9/0869; H04L 9/50
See application file for complete search history.

(56) References Cited

U.S. PATENT DOCUMENTS

| | | |
|---|---|---|
| 10,567,168 B2 | 2/2020 | Garagiola et al. |
| 2018/0288022 A1* | 10/2018 | Madisetti ........... G06Q 20/3829 |

(Continued)

FOREIGN PATENT DOCUMENTS

| | | |
|---|---|---|
| WO | 2019218055 | 11/2019 |
| WO | 2020109907 | 6/2020 |

(Continued)

OTHER PUBLICATIONS

GB1919295.4 Combined Search and Abbreviated Examination Report dated Jun. 5, 2020.

(Continued)

*Primary Examiner* — Gil H. Lee
(74) *Attorney, Agent, or Firm* — Messner Reeves LLP

(57) ABSTRACT

A method of managing an overlay network overlaid on data-storage transactions of a blockchain, whereby data content of the overlay network is stored in payloads of the data-storage transactions and overlay-layer links are defined between the data-storage transactions. The method comprises identifying a graph structure of the overlay network, wherein nodes corresponds to different ones of the data-storage transactions and edges correspond to the links. Each node is associated with a respective first key for signing an input of a child data-storage transaction to authorise writing the child to the blockchain. The method further comprises using a child key derivation, CKD, function to determine a hierarchical set of second keys having the same graph structure as the overlay network, wherein the second keys enable an additional function other than signing inputs of the data-storage transactions.

20 Claims, 11 Drawing Sheets

(56) References Cited

U.S. PATENT DOCUMENTS

2019/0220859 A1* 7/2019 Weight .................. G06Q 20/10
2021/0091957 A1* 3/2021 Ford ..................... H04L 9/3263

FOREIGN PATENT DOCUMENTS

| WO | 2020109908 | 6/2020 |
| WO | 2020109909 | 6/2020 |
| WO | 2020109910 | 6/2020 |
| WO | 2020109911 | 6/2020 |
| WO | 2020109912 | 6/2020 |
| WO | 2020109913 | 6/2020 |

OTHER PUBLICATIONS

PCT/IB2020/057894 International Search Report and Written Opinion dated Oct. 28, 2020.

Marek Palatinus et al., Multi-Account Hierarchy for Deterministic Wallets, Apr. 24, 2014, pp. 1-5, Retrieved from the Internet: URL:https://github.com/bitcoin/bips/blob/master/bip-0044.mediawiki.

Marek Palatinus et al., Mnemonic code for generating deterministic keys, Sep. 10, 2013, pp. 1-5, Retrieved from the Internet: URL:https://github.com/bitcoin/bips/blob/master/bip-0039.mediawiki.

Jack Davies, The Metanet, May 29, 2019, nChain, https://nchain.com/app/uploads/2019/06/The-Metanet-Coingeek-Toronto-29-05-2019.pdf.

* cited by examiner

Metanet tree 300 — 301, 302

Hierarchical key tree 500 — 501, 502

MAPPING KEYS TO A BLOCKCHAIN OVERLAY NETWORK

CROSS REFERENCE TO RELATED APPLICATIONS

This application is the U.S. National Stage of International Application No. PCT/IB2020/057894 filed on Aug. 24, 2020, which claims the benefit of United Kingdom Patent Application No. 1919295.4, filed on Dec. 24, 2019, the contents of which are incorporated herein by reference in their entireties.

TECHNICAL FIELD

The present disclosure relates to an overlay network such as the Metanet overlaid on a blockchain, and to determining a set of keys to map to the different nodes of the overlay network.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of-work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

A blockchain network is already a type of overlay network overlaid on an underlying network such as the Internet. However, it also possible to overlay a further layer of overlay network on a blockchain. An example of this is known as the Metanet. Each node of the Metanet is a different transaction on a blockchain. Data content and Metanet metadata is stored in a payload of each such transaction, in an unspendable output of the transaction by means of an OP_RETURN. The data content is the actual user content which the Metanet is being used to store, e.g. text, images, video or audio content, etc.; whilst the metadata defines links between Metanet nodes. The links or edges between Metanet nodes do not necessarily correspond to spending edges at the blockchain layer. I.e. if the input of a given Metanet transaction points to an output of another, funding transaction at the blockchain layer, the parent of that same transaction or Metanet node at the Metanet layer is not necessarily the same transaction as the funding transaction. Instead the links or edges at the Metanet layer define links between the data content of the Metanet.

SUMMARY

For the purpose of illustration this summary will be described in the context of the Metanet, and Metanet nodes and edges. However it will be appreciated that this is not limiting and more generally the same principles can be applied to the nodes and edges of any overlay network overlaid on a blockchain.

Each node in the Metanet network may have a key associated with it for some given function, for example the key being needed to authorise writing data content to the respective Metanet node. Further, for a given function (e.g. writing), a different individual key may be required for each of multiple different Metanet nodes. Therefore a set of multiple keys will be required, one for each of multiple different Metanet nodes.

Moreover, any given node in the Metanet network may in fact have one or more of a number of different possible functions associated with it, where each such function may require a different key. For example, a first key from a first key set may be required to write the data content to the Metanet node, whilst a second key of a second key set may be required to encrypt and/or decrypt the data content of a given Metanet node. Hence over multiple Metanet nodes, a first set of keys may be required for the first function (a different individual first key for each Metanet node), and a second set of keys may be required for the second function (a different individual second key for each Metanet node).

A given set of keys can be hierarchical in nature. This means that within the set, keys further down in the hierarchy are each derived from parent keys further up in the hierarchy, potentially over multiple generations (parent, grandparent, etc.), all the way back up to a common seed from which all the keys in the set are ultimately derived. Thus the key set may be described as having a graph structure such as tree structure, where nodes in the tree correspond to different keys in the set, and edges between nodes represent the derivation of one key from another. The seed may be thought of like the "trunk" or "root" of the tree. The keys may be derived from one another using a known type of deterministic key derivation algorithm called a child key derivation (CKD) function. Various forms of CKD functions are known which enable a system designer to derive a set of keys according to any arbitrary graph structure that he/she wishes.

It would be desirable to provide a means of allocating, managing and/or communicating the various keys of a Metanet network (or the like) in a more effective manner.

Particularly, it would be desirable if the hierarchical structure of a given key set, according to which the keys for a given function were derived from one another, mapped directly to the graph (e.g. tree) structure of the Metanet nodes and edges of a corresponding part of the Metanet (or other such overlay network overlaid on a blockchain). In other words, for a Metanet node (or the like) at a given point in the tree structure, the key needed to perform a given function on that Metanet node would be found at the same position in a corresponding hierarchical key set having the same graph structure. Then, in order to determine the key to use for a given Metanet node, one need only know the relevant seed and the position of the node in the graph structure.

Therefore according to one aspect disclosed herein, there is provided a method of managing an overlay network overlaid on data-storage transactions of a blockchain, whereby data content of the overlay network is stored in payloads of the data-storage transactions and overlay-layer links are defined between the data-storage transactions. The method comprises, by a first software module run on first computer equipment: identifying a graph structure of the overlay network, the graph structure comprising a plurality of nodes and edges between nodes, wherein each of the nodes corresponds to a different respective one of the data-storage transactions and each of the edges corresponds to a different respective one of the links. Each node is associated with a respective first key for signing an input of a child data-storage transaction in the graph structure of the overlay network, in order to authorise writing the child to the blockchain. The first keys being generated from a first seed. The method further comprises, by the first software module, using a child key derivation (CKD) function applied to a second seed in order to determine a hierarchical set of second keys having the same graph structure as the overlay network. Each second key corresponds to a different respective one of the nodes at a same position in the graph structure as the respective data-storage transaction, wherein the second keys are not used to sign inputs of the data-storage transactions but instead are provided to enable an additional function (e.g. funding or decryption).

The recited graph structure of the overlay network (e.g. Metanet network) may be a structure of part or all of the overlay network.

Each key may comprise the private key of a public-private key pair, or the public key of a public-private key pair, or both.

Previously in the Metanet, the idea of generating a hierarchy of keys with the same structure as the Metanet has only been used for the set keys for signing the inputs of the Metanet data-storage transactions (sometimes called the structure keys or writing keys). It has not previously been used to generate a hierarchical structure of any other type of keys, such as a set of keys used for funding or encryption. The present disclosure recognises that this idea can be extended to other such sets of keys.

For instance, this enables the key for a given Metanet node to be communicated between different modules of software (e.g. the wallets of different parties, or different isolated modules within a given wallet), simply by indicating the position in the graph of that Metanet node. Given a seed for the relevant key set, the receiving module can then derive the required key for the Metanet node at the indicated position in the graph structure simply based on knowing the position of that node and the seed of the graph. This provides a more efficient way of signalling keys, with less data overhead. If the seed is kept secret amongst a select group of software modules (e.g. only the sending and receiving parties or a select group of parties), then this is also more secure, since the key itself never needs to be signalled between the modules.

Hence in embodiments the method may further comprise: from the first software module, communicating an indication of one of the positions in the graph structure to a second software module, thus enabling the second software module to determine the respective first key for the node at that position based on the communicated position, and on the first seed and the CKD function used for the first keys.

Where it is said that a hierarchical set of keys has a tree structure or other such graph structure, then as will be familiar to a person skilled in the art, this means a hierarchically derived set of keys. I.e. the keys in the set are derived from one another in a hierarchical manner, starting with the seed at the top of the structure. In other words, each node in the graph structure corresponds to a respective key and each edge corresponds to a derivation of one of the keys in the set from another. Where it is said that a hierarchical set of keys has the same graph structure as the overlay network (e.g. Metanet), this means the graph structure of the hierarchical derivations between keys is the same as the structure of the links between the data-storage transactions in the overlay network. In other words, each node in the graph structure corresponds to both a respective key in the set and a respective data-storage transaction in the overlay network, and each edge in the graph structure corresponds to a respective dependency in the key set and a respective link between data-storage transactions in the overlay network.

In embodiments, the same graph structure can be used for two or more different key sets, each key set being for a different function (e.g. one for encrypting and/or decrypting the data content and another for authorising writing of the data content).

For instance, the method may further comprise, by the first software module: using a CKD function applied to the first seed in order to determine the first keys as keys of a hierarchical key set having the same graph structure as the overlay network and the second key set, each first key corresponding to a different respective one of the nodes at a same position in the graph structure as the respective node.

In this case the key sets are derived using different seeds, but have the same hierarchical graph structure. The CKD function used to determine the set of second keys could be the same form of function as that used for the set of first keys (but applied to a different seed), or could be a different form of CKD function.

Preferably, the second seed is not communicated to the second software module by the first software module, and nor is the second software module given access to the second seed in any other way.

Thus a first software module can signal an indication of the position of a node in the Metanet graph structure (or the like) to a second software module, but without divulging the second seed. For instance these modules could be the software run on the computer equipment of different parties, or could be different isolated modules run within the computer equipment of a given party. Either way, the second software module has access to the first seed but not the second. E.g. the first seed may be sent to the second module by the first module along with the node position, or the first node could be pre-known to the second module (e.g. having been shared with it previously by the first module or a third module). This enables the second software module to derive the key for the first function based on the position and the seed, but not the key for the second function for the node at the same position, because it does not have access to the second seed.

As an example application of this, the first software module may be comprised by the wallet of a customer Alice, and the second software module may be comprised by the software of a service provider Bob, who has more technical expertise than Alice. Alice pays Bob to record her data in a transaction on the blockchain as a node of the Metanet. She needs to communicate the key for writing to the node to Bob. However she is also going to encrypt the content and does not wish to divulge the encryption key to Bob. There is no reason why Bob needs to be able to decrypt the data or see it in-the-clear in order to upload it.

Another, alternative or additional example of an advantageous application of the disclosed mapping of the second key set to the overlay network graph structure, is to ensure that for at least the first software module, the structure in its key derivation is preserved so that some other entity (i.e. a third software module) would be able to recover all relevant keys for the data storage transaction (e.g. Metanet transaction) using knowledge only of the key and the position of the transaction in the structure (and the CKDs).

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
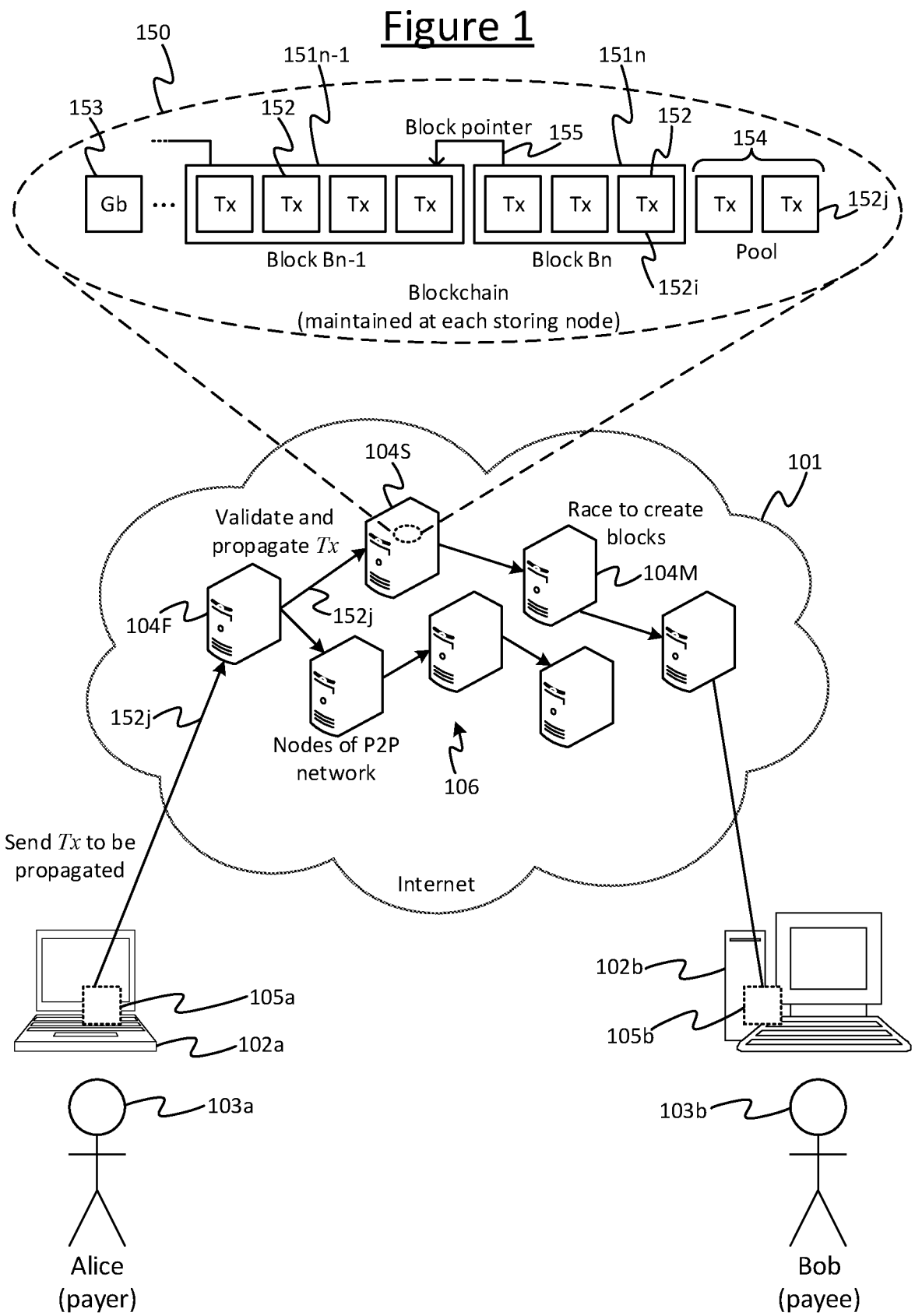
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101.

For the purpose of this sub-section a "node" refers to a node 104 of the blockchain network 106. Later a node will also refer to a node of the Metanet, or other such network overlaid on a blockchain.

Each node 104 of the blockchain network 106 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the pool 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the signature of the user 103$a$ to whom the output of the preceding transaction 152$i$ is locked. In turn, the output of the present transaction 152$j$ can be cryptographically locked to a new user 103$b$. The present transaction 152$j$ can thus transfer the amount defined in the input of the preceding transaction 152$i$ to the new user 103$b$ as defined in the output of the present transaction 152$j$. In some cases a transaction 152 may have multiple outputs to split the input amount between multiple users (one of whom could be the original user 103$a$ in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152$j$, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152$j$ matches the expected signature, which depends on the previous transaction 152$i$ in an ordered sequence of transactions 152. In an output-based case, this may comprise checking that the cryptographic signature of the user included in the input of the new transaction 152$j$ matches a condition defined in the output of the preceding transaction 152$i$ which the new transaction spends, wherein this condition typically comprises at least checking that the cryptographic signature in the input of the new transaction 152$j$ unlocks the output of the previous transaction 152$i$ to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152$j$ is valid, the current node forwards it to one or more others of the nodes 104 in the P2P network 106. At least some of these nodes 104 also act as forwarding nodes 104F, applying the same test according to the same node protocol, and so forward the new transaction 152$j$ on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152$j$ according to the node protocol. Another condition for a transaction to be valid is that the output of the preceding transaction 152$i$ which it attempts to spend or redeem has not already been spent/redeemed by another valid transaction. Again if not valid, the transaction 152$j$ will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151$n$ pointing back to the previously created block 151$n$-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151$n$, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151$n$. This reward gives an incentive for the miners 104M to participate in the proof-of-work race. Often a regular (non-generation) transaction 152 will also specify an additional transaction fee in one of its outputs, to further reward the winning miner 104M that created the block 151$n$ in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103$a$ and his/her respective computer equipment 102$a$, and a second party 103$b$ and his/her respective computer equipment 102$b$. It will be understood that many more such parties 103 and their respective computer equipment 102 may be present and participating in the system, but for convenience they are not illustrated. Each party 103 may be an individual or an organization. Purely by way of illustration the first party 103$a$ is referred to herein as Alice and the second party 103$b$ is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152$j$ to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152$j$, it handles it in accordance with the node protocol and its respective role. This comprises first checking whether the newly received transaction 152$j$ meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152$j$ passes the test for being deemed valid (i.e. on condition that it is "validated"), any storage node 104S that receives the transaction 152$j$ will add the new validated transaction 152 to the pool 154 in the copy of the blockchain 150 maintained at that node 104S. Further, any forwarding node 104F that receives the transaction 152$j$ will propagate the validated transaction 152 onward to one or more other nodes 104 in the P2P network 106. Since each forwarding node 104F applies the same protocol, then assuming the transaction 152$j$ is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
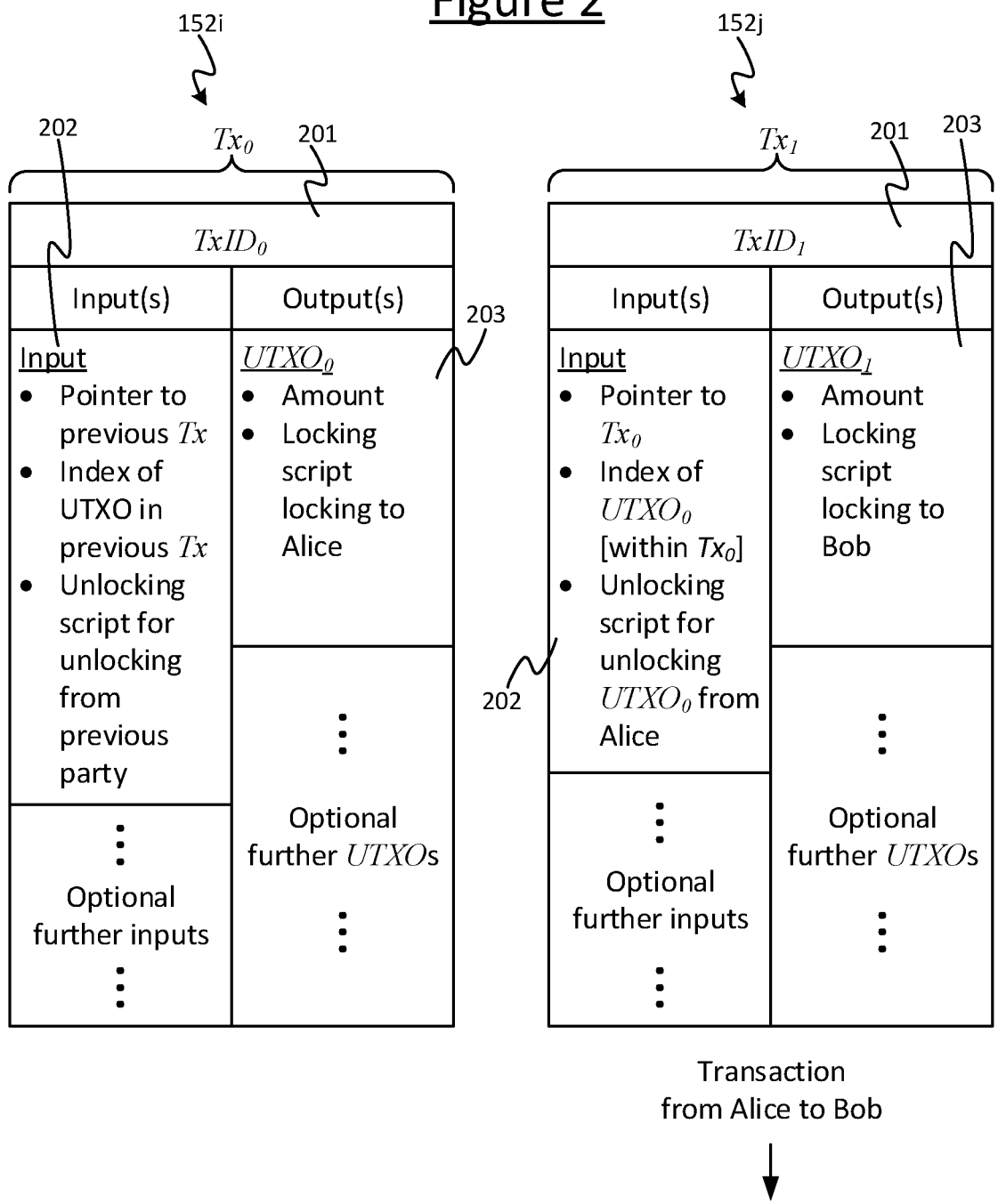
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< ... >" means place the data on the stack, and "[ . . . ]" is a function comprised by the unlocking script (in this example a stack-based language).

Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)>OP_EQUALVERIFY OP_CHECKSIG. "OP_. . ." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Layer-2 Overlay Network

A blockchain network 106 is already a form of overlay network overlaid on a network such as the Internet 101. However, it is also possible to layer another layer of overlay network on top of a blockchain. This is illustrated by way of example in FIG. 3. An example is the Metanet. Such a network could also be referred to as a "layer-2" network, in the sense that it is a second layer of overlay network relative to a base network 101 (e.g. Internet) as the underlying network infrastructure and the blockchain network 106 as the first layer of overlay network overlaid on the base network.

This second tier of overlay network 300 comprises a network of nodes 301 and edges 302. Note that a node 301 now refers to a node at the layer of the Metanet (or other such network overlaid on the blockchain), not a node 104 at the layer of the blockchain network 106 as discussed previously in relation to FIGS. 1 and 2. Each node 301 of the Metanet network (or the like) is a different respective transaction 152 on the blockchain 150, each of which stores data in a payload of the respective transaction. Hence a node 301 of the Metanet network 300 (or the like) may also be referred to herein as a data-storage node or data-storage transaction. The data stored therein may comprise data content and/or metadata, typically both. In an output-based model it may be stored in an unspendable output 203 of the respective transaction. The output may be made unspendable by means of an opcode in the locking script that terminates the script when run. E.g. in a system that employs the Script language, this may be the OP_RETURN opcode. However this is not limited and the person skilled in the art will be aware of other techniques for storing any arbitrary payload data in a transaction in other blockchain systems, e.g. in a system employing an account-based model. The following may be exemplified in terms of an output-based model, but this is not limiting.

Note that the layer-2 overlay network 300 may consist purely of data, being entirely virtual. I.e. the nodes 301 and edges 302 of the Metanet or such like, as an overlay network overlaid on the transactions 152 of the blockchain 150, do not necessarily correspond to any particular physical actors or entities of the underlying blockchain network 106 or underlying network infrastructure 101.

The data content is the actual data the Metanet (or the like) is being used to store, e.g. text, audio, still or moving images, or other files or documents. It may also be referred to as user content or user data. The metadata implements the protocol for layering the network on top of the blockchain 150. In at least some of the transactions 152 it defines links between the data content. These may also be described as edges 302 between the nodes 301. The link or pointer may for example comprise the transaction ID, $TxID_{parent}$, of the parent node. Note that a "link" as referred to herein does not necessarily imply a hypertext link, though that is one possibility. More generally a link could refer to any form of pointer pointing to another node 301 to which the current node 301 is related at the Metatnet layer (or other such overlay layer layered on top of the blockchain 150).

For convenience the following will be described by way of example in terms of the Metanet, but it will be appreciated that this is not limiting and more generally, anywhere herein where reference is made to the Metanet, this may be replaced with any overlay network overlaid on a Blockchain. Similarly any reference to a Metanet node may be replaced with reference to any overlay network node, or data-storage node of the overlay network, and any reference to a Metanet link or edge may be replaced with reference to any overlay network edge or link at the layer of the overlay network in question.

The Metanet protocol defines a scheme and standard for structuring on-chain data that can be mined onto a public blockchain and used in various applications for many use cases. The protocol specifies that graph structures, comprising nodes and edges, can be constructed from sets of blockchain transactions, and that these structures may be used to store, convey, represent and distribute data ('content') of any nature. By treating transactions as nodes, and signatures as edges created between transactions, the Metanet protocol allows for the creation of on-chain graph structures as shown in FIG. 3.

As can be seen, the nodes 301 and edges 302 of the Metanet 300 form a tree structure. I.e. a parent node 301 is linked to one or more child nodes 301, and any given child 301 may itself be a parent linked to one or more children of its own, and so forth. Note that the tree structure in question for the present purposes may only be a subset of a wider tree or graph.

Figure 3:
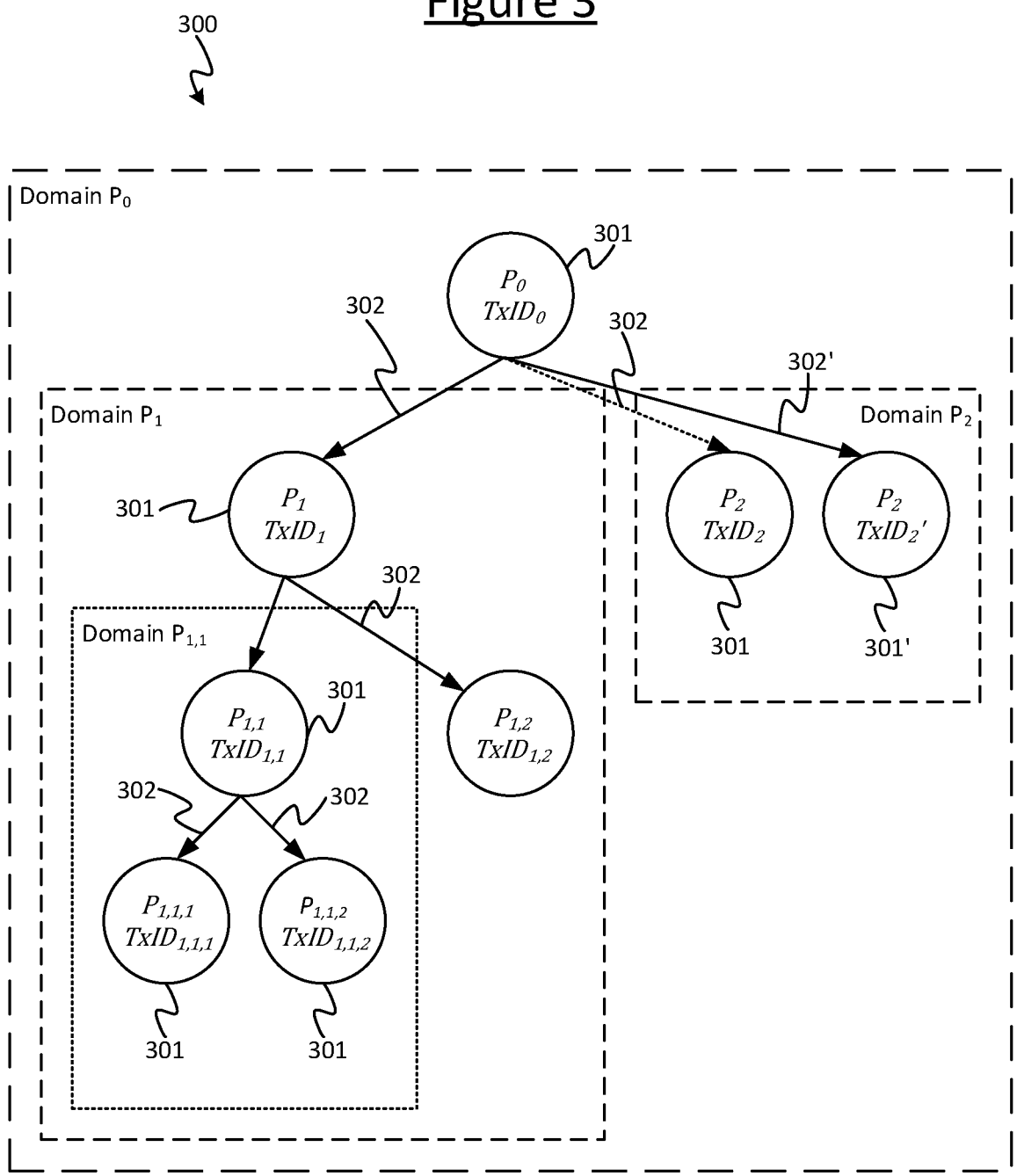
FIG. 3 is a schematic illustration of a network overlaid on a blockchain.

FIG. 3 also illustrates how a node 301 and its associated edge 302 may be updated. Since transactions are recorded immutably on the blockchain 152, an update to a Metanet node 301 requires creating a new instance 301' and corresponding edge 302' by means of a new transaction 152.

The structure of FIG. 3 may comprise nested domains, e.g. the structure of a website and its pages, where a 'top level domain' encapsulates the sub domains below it, and so on. One functional key domain (to be discussed later, e.g. the domain of the writing keys, funding keys or encryption keys) can span many of these structure domains. The structural "domains" shown in FIG. 3 should not be confused with the functional key domains discussed later.

The circles in FIG. 3 represent nodes, which are simply transactions that are created according to the rule set of Metanet protocol. An example of a transaction 152N that is created and formatted according that rule set is shown in FIG. 4.

Figure 4:
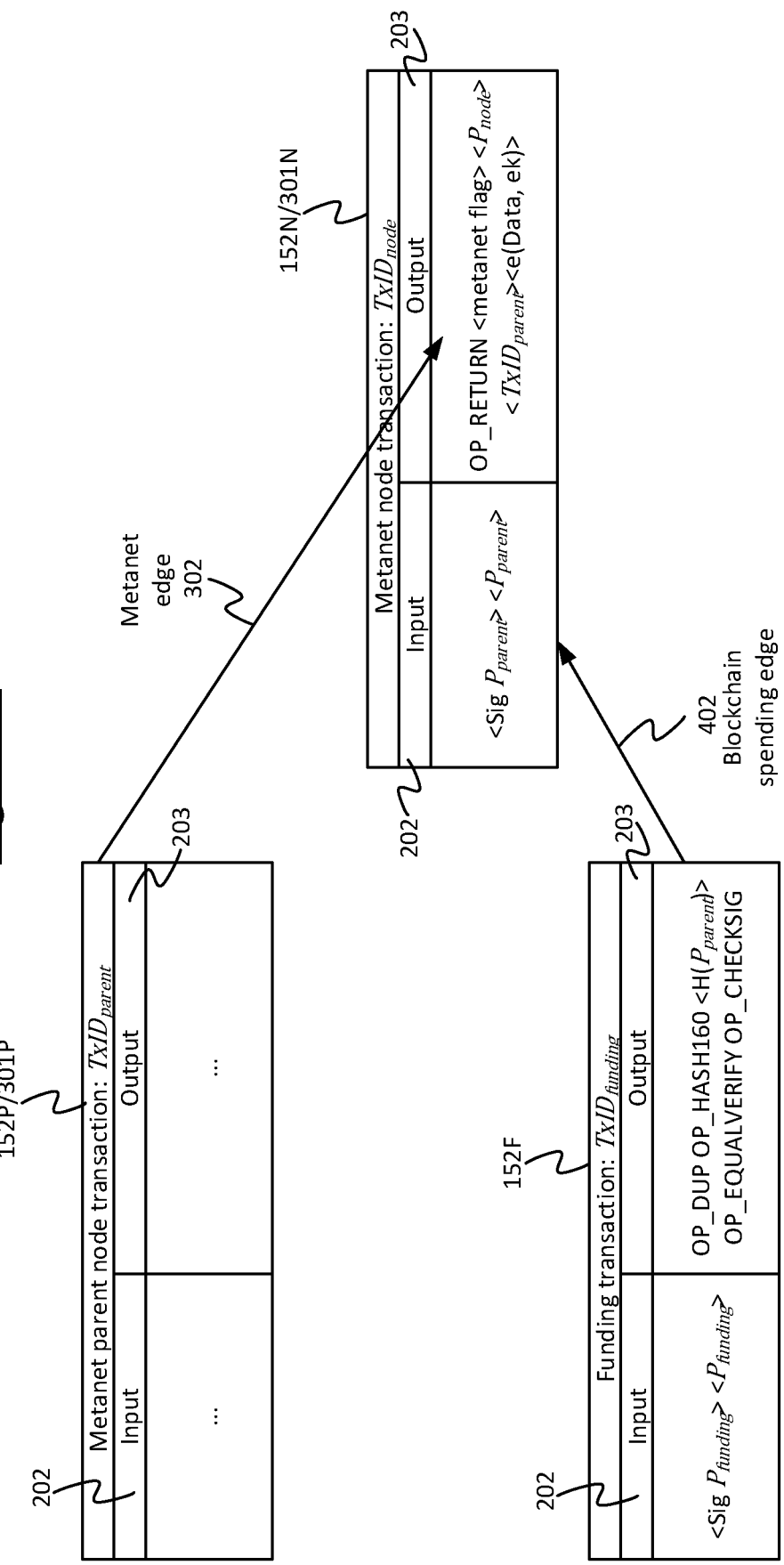
FIG. 4 is a schematic transaction diagram illustrating an example protocol for overlaying a network such as the Metanet on a blockchain.

The transaction 152N on the right-hand side of FIG. 4 represents a transaction 152 of the blockchain 150 implementing a given node 301N (a child) of the Metanet. The transaction 152P in the top-left of FIG. 4 represents a transaction of the blockchain 150 which implements a parent of the child node 152N at the Metanet layer. The child node transaction 152N has an input 202 which comprises an unlocking script, and which points to the output 203 of a funding transaction 152F of the blockchain 150. In other words the output of the funding transaction 152F is consumed by the input of the Metanet node 152N. Note that the funding transaction 152F and the Metanet parent transaction 152P are not necessarily the same transaction (though that is not excluded either).

The child transaction 152N includes an unspendable output 203, e.g. made unspendable by an OP_RETURN, which holds a payload (a payload from the perspective of the blockchain layer). This payload may comprise data content of the Metanet, which may or may not be encrypted. In FIG. 4, by way of example, the data content ("Data") is shown encrypted by an encryption function e and an encryption key ek. However this could be replaced by the data content in the clear (in which case <e(Data, ek)> would be replaced by just <Data> in FIG. 4). In the case where the data content is encrypted, the encryption key ek, or a corresponding decryption key, will be required to decrypt the data and thus view it in-the-clear.

The payload of the child transaction 152N also comprises metadata of the Metanet network layer. This metadata comprises at least the transaction identifier of the parent transaction 152P. This creates a link (edge) 302 at the Metanet layer. It may also be required by the Metanet protocol to include a key $P_{node}$ associated with the child node 301N.

The locking script of the output 203 of the funding transaction 152F also requires a signature to be included in the unlocking script in the input 202 of the child node 152N. Specifically, this signature is required to be a signature signed using a key $P_{parent}$ associated with the Metanet parent (i.e. a message signed by that key). This creates an edge 402 (sometimes called a spending edge) at the blockchain layer. If the required signature is not included in the unlocking script in the input 202 of the child transaction 152N, then the child transaction 152N will not be validated by the nodes 104 of the blockchain network 106, and hence will not be propagated through the blockchain network 106 nor recorded on the blockchain 150. Note again however that the funding transaction 152F is not necessarily the same blockchain transaction 152 as the Metanet parent transaction 152P, and hence the blockchain layer spending edge 402 is not necessarily the same as the Metanet layer edge 302.

FIG. 4 outlines only certain relevant components of a Metanet transaction as an abstraction of the transaction in its entirety. These components, in addition to a protocol identifier flag, include:

A public key $P_{node}$;
A signature Sig $P_{Parent}$ of a parent public key $P_{Parent}$;
The transaction ID $TxID_{node}$ of the node itself; and
The transaction ID $TxID_{Parent}$ of the parent of the node.

The placeholder <Data> refers generally to any content data that may be included in the Metanet node transaction. It is also likely in many applications that one would want to encrypt the data with an encryption key ek, in which case the data included in the transaction is cast as <e(Data, ek)>, where e( ) is a suitable encryption function.

Each Metanet node 301 can be uniquely identified by the pair ($P_{node}$, $TxID_{node}$), which is an index that allows for powerful versioning and permissioning control to be inherited by Metanet graphs. It should also be appreciated that each Metanet node contains enough information to identify itself ($P_{node}$, $TxID_{node}$) and its parent ($P_{parent}$, $TxID_{parent}$).

In order to ensure that a Metanet node 301N transaction contains the correct input signature Sig $P_{Parent}$ from a parent node 301P, it may be desirable in many cases to create funding transactions to facilitate this, which is shown in the bottom-left of FIG. 4.

The parent key $P_{parent}$ and/or child node key $P_{node}$ can be seen as a writing key that authorises writing the data of the child node 301N to the blockchain 150. These may also be referred to herein as "structure keys".

Hierarchical Key Sets

The keys associated with blockchain transactions 152, pertaining to a particular user or application, are typically managed using a hierarchical key structure. For instance, a common standard, known as hierarchical deterministic (HD) key management, has emerged for handling the many private and public keys that may be associated with a given user's wallet. The standard is designed to facilitate the handling of many such key-pairs by: ensuring that all keys in a user's wallet can be derived from a single source of entropy; and ensuring that keys are derived in a deterministic manner from that seed, using publicly-known derivation functions. HD wallets in themselves are well-known, and are simply wallets which use the well-defined standards for deriving keys to be used in transactions outlined in multiple improvement proposals known as "BIPs", namely BIP32, BIP 39 and BIP44. In essence, these standards define ways to: deterministically generate many private and public keys from a 'seed' key; define 'paths' for generating a particular descendent key from a seed key; and define hierarchical wallet structures using the deterministic key derivation functions. These standards for handling keys associated with a given user's funds, or with the transactions of a particular application, are widely used in the blockchain industry.

A deterministic algorithm for deriving one key from another key in a deterministic manner is sometimes referred to as a child key derivation (CKD) function. Thus a set of keys can be determined, starting from a seed, which are all related to one another in a hierarchical manner. Such a hierarchal set of keys also has a tree structure. That is, the keys within the set are derived from one another in a hierarchy of derivation which follows a tree structure. I.e. one or more keys are derived from the seed, and then for each such child of the seed, one or more keys may be derived from that key, and so forth. In this tree structure each node is a key and each edge represents the derivation of that key from its parent. Given the parent key or seed it is possible for any party who knows the algorithm to deterministically determine its child or children, but given a child key it is not possible (or at least not computationally feasible) to determine the parent key. Various forms of CKD are known in the art which allow one to generate a hierarchical key set with any arbitrary graph structure (e.g. tree structure) that is desired. One particular example is discussed later, by way of illustration only.

Note: where it is said that a given key or a key graph structure is derived by applying a CKD to a seed or parent key, this does not exclude that the key or graph structure may be derived by applying the CKD to the seed/parent and some other data. For instance, in embodiments the CKD function takes as an input: a parent key or seed, some other data called a chain code, and an index for which the child (of multiple siblings) is being created for the given parent. Equivalently one could consider the chain code and/or indices as being parameters parameterizing the form of CKD.

Note also that the term "seed" as used herein does not necessarily imply that the seed is the absolute highest level key in an overall hierarchy or tree. More generally, one can apply the CKD to any key in a hierarchy to generate one or more child keys from it. The "seed" herein is simply any parent key or value from which other child keys of a given key set are derived. In embodiment the seed may itself be a child key of another key or seed in a wider hierarchy (e.g. see FIG. 6, to be discussed in more detail later).

Figure 5:
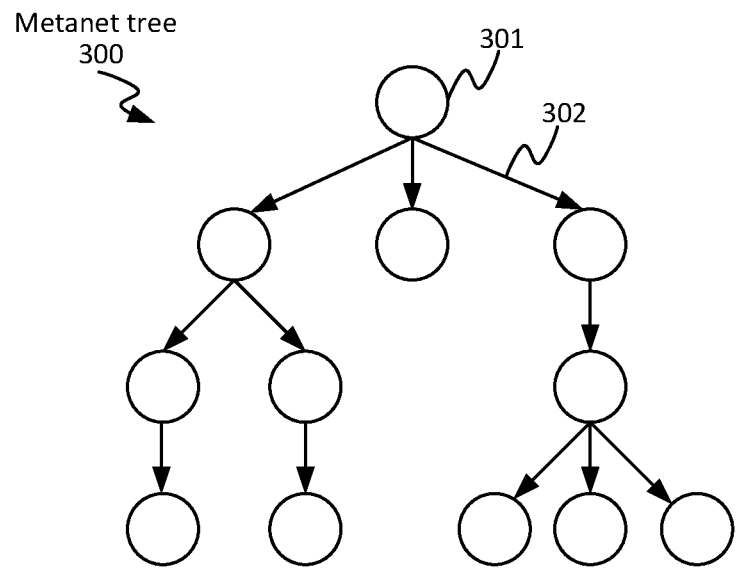
FIG. 5 schematically illustrates a hierarchical set of keys having the same tree structure as at least part of a network of Metanet nodes.
Figure 5:
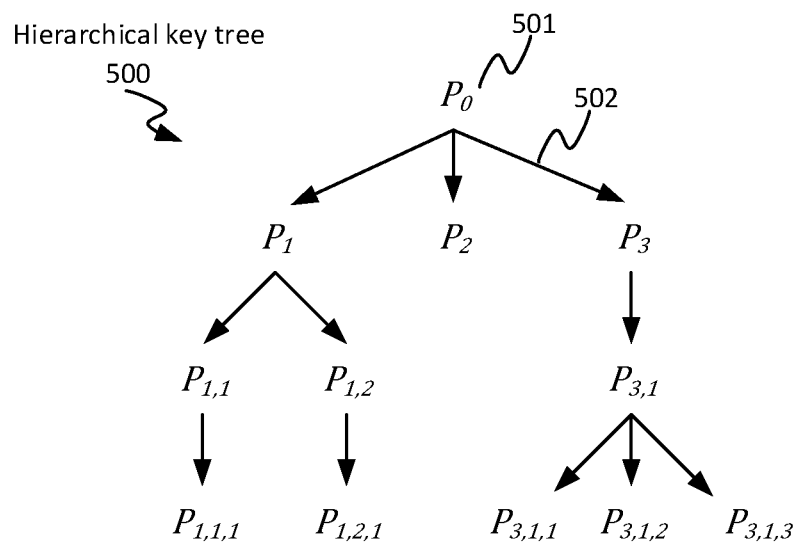

It would be desirable to employ the above framework for Metanet structures. Particularly, a CKD function may be used to map the keys P that define the Metanet structure to an HD wallet or the like. This is illustrated by way of example in FIG. 5.

As discussed above, each Metanet node 301 has a key P associated with it at the Metanet network layer (see $P_{node}$ and $P_{parent}$ in the example of FIG. 4). It would be advantageous to generate these keys according to a tree structure 500 that maps directly onto corresponding tree structure 300 of the Metanet network nodes 301 and edges 302. That is, each Metanet node 301 in the Metanet tree structure maps uniquely onto one corresponding key in the key tree 500, and each Metanet edge 302 maps uniquely onto one corresponding key derivation edge in the key tree 500. This will mean that given the position of a node 301 in the Metanet tree, and knowledge of a seed, and the form of CKD function used, it will always be possible to derive the relevant key required for that node 301.

Figure 8:
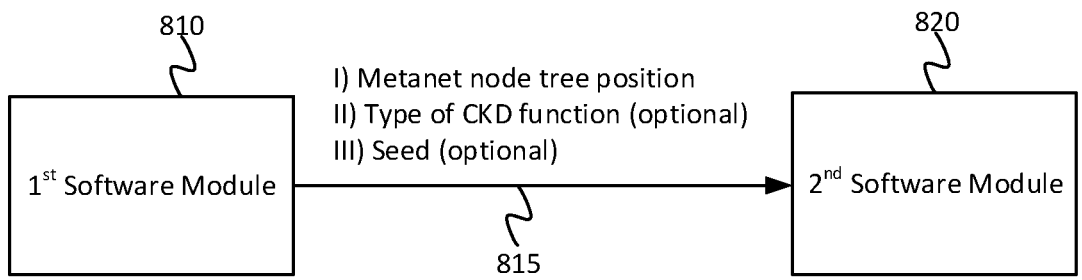
FIG. 8 is a schematic block diagram illustrating communication of a key between a first software module and a second software module.

An advantageous application of this is to allow for more secure and/or compressed (lower overhead) communication of keys between different modules of software. This is illustrated in FIG. 8. FIG. 8 shows a first software module 810 and a second software module 820. For instance these could be modules of software on separate pieces of computer equipment communicating remotely (e.g. over the Internet 101). And/or, they could be modules of software run by different parties. Alternatively they could be different modules of software run on the same computer equipment of the same party, where at least some degree of isolation is desired between the two modules (e.g. so that if one breaks or is compromised, the other is not). They could be implemented in the wallet software of a client 103 of the blockchain network 106, or the node software of a node 104 of the blockchain network 106 (e.g. miner software). They may be physically stored on one or more memory units and run on one or more processing units of any of the types discussed previously in relation to FIG. 1, and/or any other type familiar to a person skilled in the art.

The first software module 810 is to send a communication 815 to the second software module 820, to communicate to the second module 820 a key associated with a given node 301 of the Metanet 300, in order to enable the second software module 820 to perform a function in relation to that node 301 which requires the key to perform. The communication 815 may comprise one or more individual signals or messages.

To communicate the key, the first module 810 need only include in the communication 815, I) the position of the node 301 in the Metanet tree structure. The communication 815 may also include an indication of II) the form the of CKD function used if there are different possible option for this. Alternatively the form of CKD could be a fixed, predetermined kind pre-known to the second module 820, in which case it does not need to be signalled in the communication 815. Either way, if the seed is predetermined and pre-known to the second module 820, then neither the key itself nor the seed needs to be included in the communication 815. For instance the seed may be a shared secret between the first and second modules 810, 820; e.g. shared once with the second module 820 by the first module 810 or by a third, administrator module at some initial point in time. This means that when the first module 810 communicates keys to the second module 820 for different Metanet nodes 301 at subsequent points in time, it does not need to explicitly signal the keys; thus reducing the risk of interception and/or avoiding the signalling overhead of sending the key or seed each time for each Metanet node 301.

Note again that the tree structure 300 may only be a subset of the overall Metanet graph. Hence the seed could simply be the parent key at some level of hierarchical domain, and the seed may itself have a parent further up the tree or graph.

In some other applications the communication 815 may also include III) the seed. This will be discussed in more detail later.

Functional Key Domains

If we examine a typical Metanet transaction 152N such as shown in FIG. 4, which may contain encrypted data, and its corresponding funding transaction 152F, it can be seen that there are a number of different keys that are associated with a single Metanet node 301 (e.g. $P_{node}$, $P_{parent}$, $TXID_{node}$, ek).

There are potentially many different types of keys associated with a Metanet node and its corresponding funding transaction. For example these may be classifies according to their functions as follows:

Structure (writing) keys—$P_{node}$, $P_{parent}$
Encryption keys—ek
Funding keys—$P_{Funding}$ It should be noted that in more complex examples of Metanet transactions, there may also be other key types relating to other functions used to create a Metanet node transaction 152N or and/or perform other functions in relation to a Metanet node 301. For instance, another type of key could be an application layer key that facilitates an application layer function, e.g. idempotency keys (to ensure that the data of the node 301 is not used more than once or counted twice for some application layer purpose). As another example, as an alternative or in addition to encryption, the data content could be subject to another form of obfuscation such as padding or re-ordering, which may require a corresponding obfuscation key to obfuscate and/or de-obfuscate.

As discussed previously, it is advantageous to take advantage of the prevalence and robustness of the HD wallet standards (or the like) to manage keys, and in embodiments disclosed herein this desire extends to any or all such key types, e.g. structure keys, encryption keys, and funding keys. However, different key types may need to be handled and manage separately. Also, preferably all keys should stem from the same seed to reduce risk of compromise. These two requirements are, however, quite contradictory. It is not immediately clear how one should ensure the separation of keys while maintaining that all stem from the same seed key. To complicate things further, as discussed above, a further desirable property of such HD key hierarchies is that the derivation path for a given key should be mapped (at least in part) to a Metanet graph structure. In other words, the desire to reflect a Metanet graph structure in a key hierarchy (e.g. as in FIG. 5), acts as a third requirement that must be met, in addition to reconciling the first two conflicting requirements.

The following discloses a solution to this problem by defining functional key domains as branches of an HD wallet whose keys pertain to a single function involved in the creation of a particular transaction.

In the case of a Metanet transaction, where there may be two, three or more distinct functions to account for (e.g. structure, encryption, and funding), each key type will be assigned an independent branch of an HD key structure.

The writing keys (i.e. structure keys) $P_{node}$, $P_{parent}$ are used to sign Metanet transactions, the encryption keys are used to encrypt any content data included in the transactions, and the funding keys are used to sign the funding transactions whose UTXOs are consumed by the Metanet transactions.

All keys in the overall HD structure are unique, and cannot be related to one another without knowledge of the master key (mk) pair (master seed) for the wallet. However, they are related in that they all pertain to the same Metanet structure position. This common position is encoded using a system of multiple path types embedded within the overall path for a given key.

Figure 6:
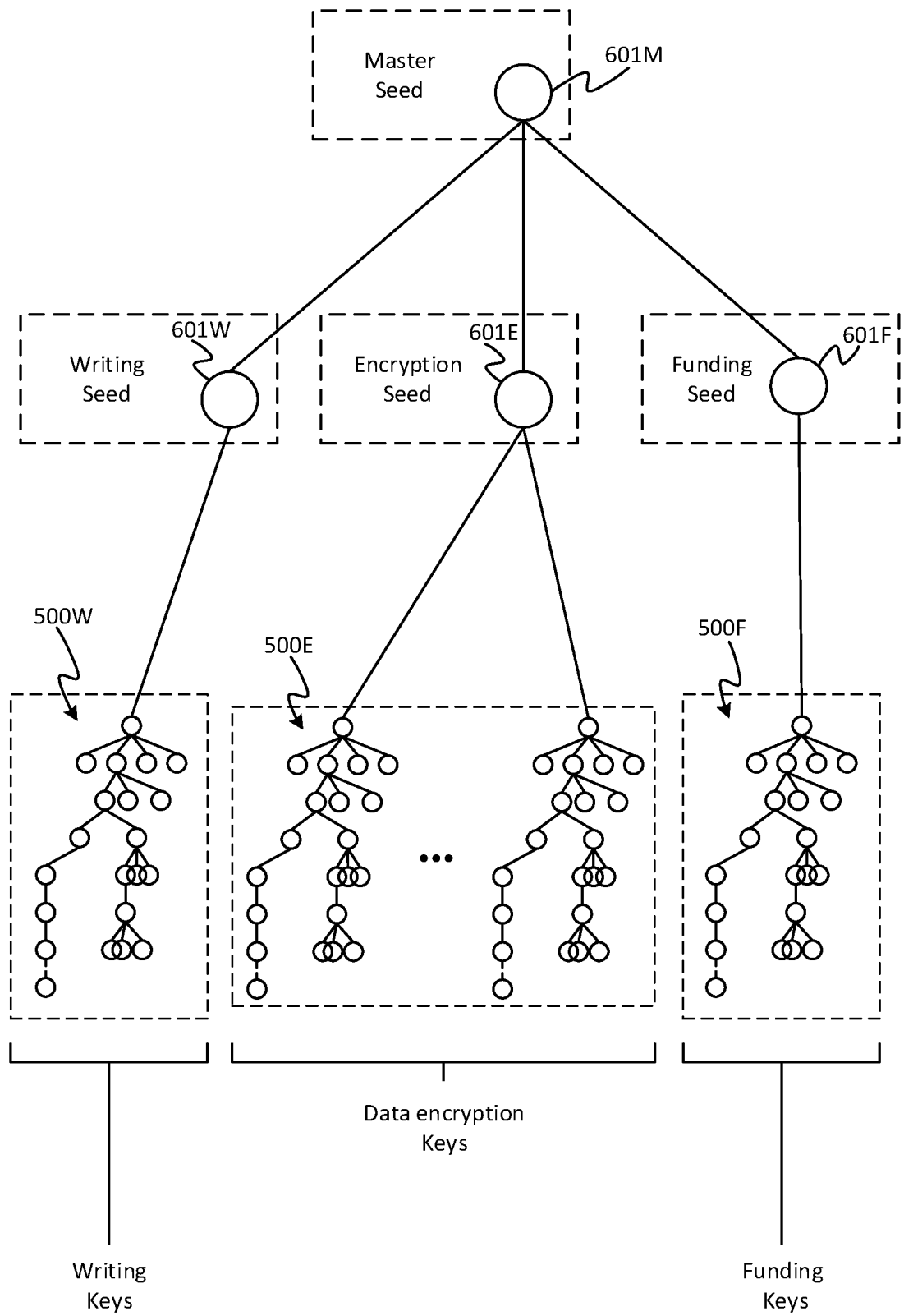
FIG. 6 schematically illustrates a scheme for deriving multiple key domains, each comprising a hierarchical set of keys.

FIG. 6 illustrates an example of allocating different functional key domains. FIG. 6 illustrates an example derivation tree, which may be created using a CKD function. Preferably, at the top (source or root) of the tree is the master seed 601M (mk). Derived from this are a plurality of child seeds, one for each of the multiple types of function. Each child seed acts as the source/root of a respective set of keys for the respective type of function (e.g. writing, encryption and funding). In the example illustrated there are three child seeds for three such functions respectively: a writing seed 601W for deriving the set of writing keys P to enable writing the Metanet nodes 301, an encryption seed 601E for deriving the set of encryption keys ek for encrypting and/or decrypting the data content of the nodes 301, and a funding seed 601F for deriving the set of keys for funding the recordal of the corresponding transactions 152 of the nodes 301 on the blockchain 150. The seeds themselves may be thought of as a type of key (a sub-master key or seed of its respective key set in the case where all are derived from the same master key 601M).

Each set of keys comprises a respective tree structure according to which the keys in the respective key set are derived from one another. Each such tree-structure is a sub-tree of the overall tree stemming from the master seed 601M. Within each key set, the tree structure maps directly onto the tree structure of the Metanet 300. Thus the tree structures of the different key sets are the same as one another. So for example, there is one writing key per node 301 of the Metanet (or the fragment thereof in question), and the edges of derivation for those keys follow exactly the corresponding edges 302 in the Metanet tree structure 300. And at the same time, there is one funding key per node 301 of the Metanet (or the fragment thereof in question), and the edges of derivation for the funding keys follow exactly the corresponding edges 302 in the Metanet tree structure 300 and the ends between the corresponding writing keys in the writing key set. And similarly for encryption and/or any other function for which a key set is to be derived according to this scheme.

Note: a given key here may refer to a private key, or a public key, or a public-private key pair. In embodiments the private key is derived first according to the tree structure and then a corresponding public key is derived from the private key.

Note also that for one or more of the types of function, e.g. encryption, there may be multiple key sets generated, e.g. for multiple layers of encryption. In this case each of the encryption key sets has the same tree structure, as illustrated by way of example in the bottom-middle of FIG. 6.

Further, note again that the term "seed" as used herein does not necessarily imply the absolute ultimate master seed of the wider tree structure. For instance, the writing seed 601W is itself a child key of the master seed 601M. A seed is simply any type of key or value, which can be used to derive other keys. In embodiments the seeds of the different functions (e.g. 601W, 601E, 601F) are actually just keys all derived from some master seed or key 601M. A seed as referred to herein may refer to a special type of key that (at least locally) is the 'top' key of the hierarchy for a given set of keys, but may be a child in a wider hierarchy.

It will be appreciated that the examples of writing, encryption and funding are just some examples of the different types of function that may be implemented in the Metanet (or the like) for which respective key sets may be required, with a key per node within a given set for a given type of function. More generally, the scheme outlined above could be applied for the key sets of any first and second function, and in some embodiments a third function or more. For instance, encryption could be generalized to any obfuscation (e.g. padding or re-ordering). Or the scheme could be used for a completely different type of key, such as an application layer serial number to be assigned to each Metanet node 301 for some application layer purpose (e.g. idempotency).

An advantageous application of the described scheme can be seen by returning to FIG. 8. Consider the case where the first software module 810 wishes to signal a key of a first key set to the second software module 820, but without compromising any of the keys of a second key set, or without explicitly communicating the key itself. Again the first and second modules 810 may be run on different remote computer equipment, and/or by different parties; or could be isolate modules within the software of a given party and/or run on the same equipment. Either way, consider the case where a first set of keys enable a first type of function (e.g. writing nodes 301 to the Metanet), and a second set of keys enables a second type of function (e.g. decrypting the data content of the nodes). Within a given set, each key enables the function for a different corresponding one of the Metanet nodes 301. To enable the second module 820 to perform the first function in relation to a particular one of the nodes 301, the first software module 810 can send a communication 815 to the second module 820 indicating the corresponding first key in terms of at least I) position of the corresponding node 301 in the Metanet key structure 300. Optionally it may also signal II) the form of CKD function used, and III) the first seed (the seed from which the first key set for the first function is derived, e.g. 601W). Alternatively one or both of these II, III) may be predetermined and pre-known to the second module 820. Either way, the second key or seed (e.g. 601E) are not sent. The second software module 820 can thus derive the relevant first key for the first function (e.g. writing), because it knows the relevant first seed and the position in the tree structure of both the node 301 and the corresponding first key. However it cannot derive the key for the second function (e.g. decryption), because it does not have the second key.

For instance, the first software module 810 may be a wallet of Alice 103*a*, and the second software module 820 could be the software of a service provider Bob 103*b* or a miner 104. Take Bob as an example. Alice does not have the technical expertise to upload data content to the Metanet 300. Bob provides a service that will do this for Alice. In order for Bob to do this on behalf of Alice, he will need her writing key for Peach node 301 to be written to the blockchain 150. However the data content of one or more of the nodes 301 is also to be encrypted with a corresponding encryption key for each such node. Alice does not want Bob to be able to decrypt the data content, and nor is there any reason why he would need to be able to in order to uploaded it in encrypted form. Therefore Alice may use the disclosed method to communicate to Bob keys from the first key set (in this case for writing) without compromising the second key set (the encryption keys).

Note, in this application Alice may optionally signal the first seed III) in the communication 815 to Bob, as the aim is to avoid Bob being able to derive the second key set, and he is not sent the second seed nor provided with access to it in any other way.

In embodiments the encryption key could be for a symmetric encryption scheme (e.g. AES) where the encryption key ek used to encrypt the data is the same as the key needed to decrypt the data. Alternatively an asymmetric encryption scheme (e.g. ECIES) could be used, where a different key is required to decrypt the data. In this case the "encryption" keys of the second key set may be the decryption keys and the "encryption" key communicated to the second software module 820 may be the decryption key (referred to generally as an "encryption key" in the sense that it is a key used in the application space or context of encryption).

The funding keys $P_{funding}$ are another example of the keys that Alice may want to prevent Bob from knowing. The funding keys are keys Alice will use to sign the transactions that make payment for uploading the Metanet transactions, so she may not want Bob (or anyone else) to get hold of them so they can pay themselves without the service being provided.

Note that the funding transaction does not necessarily pay Bob. Rather the funding transactions are just (or at least) paying for the data storage transactions to get on the blockchain, and as a minimum this may just pay a mining fee. Alice may or may not pay Bob for the service, either on-chain or off-chain. A more compelling reason for having the second set of keys outsourced may be for handling and volume. I.e. if a company (Alice) wants to put lots of data on the blockchain but doesn't want to (a) purchase the native crypto token (the digital asset) to do so, or (b) deal with the optimisation concerns of using enterprise grade wallets to do UTXO-management and transaction creation, then they may just want to outsource the whole process to the other party (Bob).

If Alice is the one who wants to put the data on chain, and Alice is going to 'pay' Bob to do it, it's not necessarily a problem if both parties know the funding keys, as they're just doing a job, and Alice may have covered Bob's costs from creating the funding transaction via a fiat or other off-chain settlement or business transaction.

In another example use case, the first and second software modules 810, 820 could be different isolated functions within a given wallet application. For instance the first module 810 could be a writing function (corresponding to the left-hand branch in FIG. 6) and the second function could be an encryption function (corresponding to the middle branch in FIG. 6). In this case, if one module breaks or is compromised, the key set of the other, isolated module need not be compromised or affected along with it.

Note again that the derivation of the keys is one-way from top to bottom of the tree. I.e. one cannot go back upstream to determine the parent key from the child, but one can determine the child key from a parent. So if the first seed is shared, this does not compromise the master seed, and therefore does not compromise the second seed or any of the keys derived from it. One can 'go down but not up' the tree. In embodiments there may also be other restrictions that can be placed on keys that mean it is not even possible to even go down certain branches, and this can be applied on a key-by-key basis, using a process called hardening.

As another, alternative or additional advantageous reason to adopt the disclosed scheme, one or both of the software modules 810, 820 may wish to ensure that the structure in their key derivation is preserved so that some other entity (i.e. a third software module) would be able to recover all relevant keys for the Metanet transaction using knowledge only of their key and the structure/position of the Metanet transaction in the structure (and the CKDs). This reasoning may apply irrespective of whether the first and second modules 810, 820 communicate keys with one another in the above-described manner.

Figure 7:
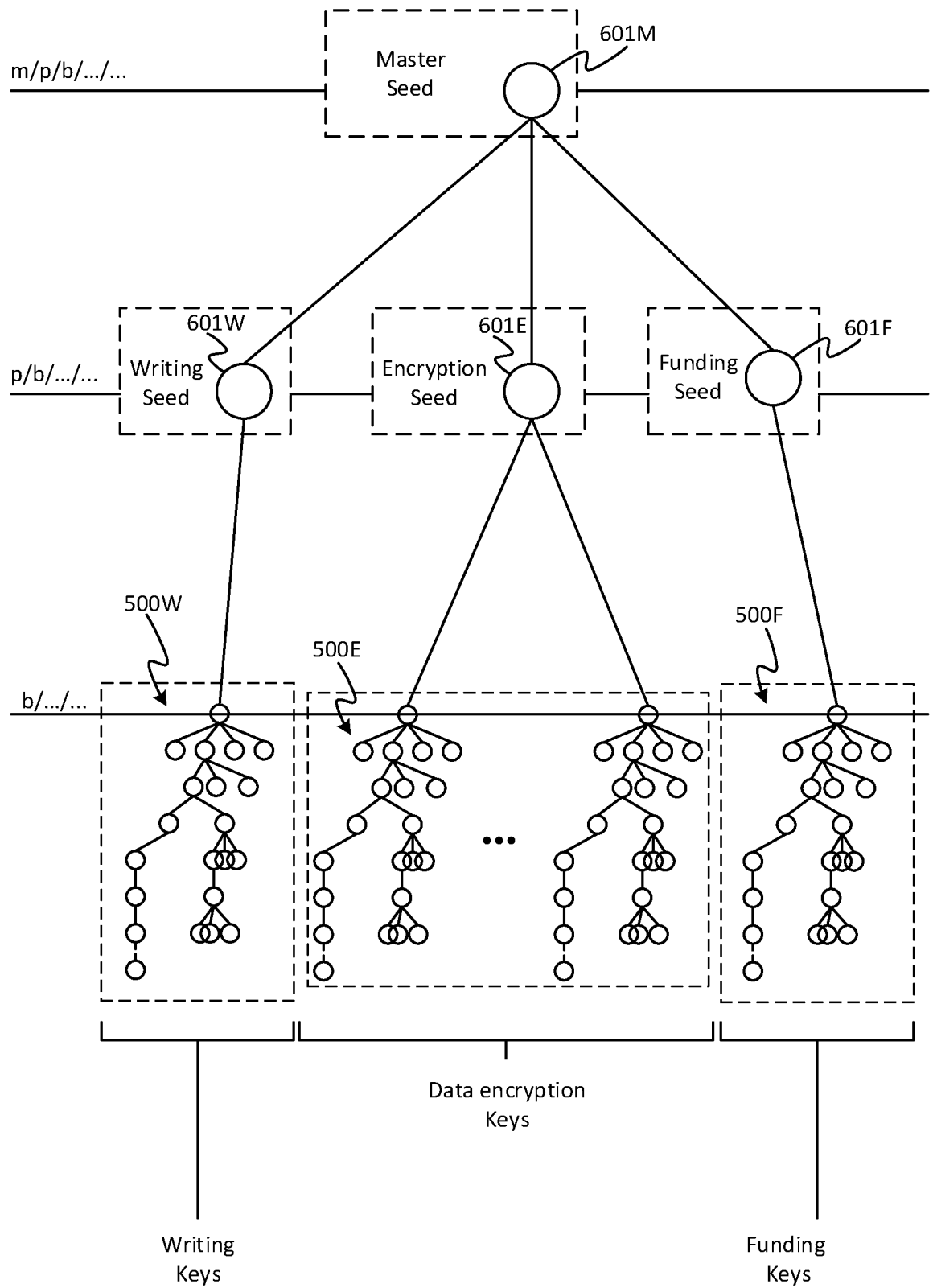
FIG. 7 schematically illustrates different path types of the scheme shown in FIG. 6.

FIG. 7 illustrates the concept of path types. In order to ensure that the keys relating to different functions can be handled separately by different entities, embodiments use a function-based path structure for key derivation that can be broken down into multiple different path types, depending on the vertical level in the key hierarchy. For example:

m-paths: top-level paths, can describe anything in the hierarchy;
p-paths: function-level paths (encryption paths, writing paths, funding paths); and
b-paths: Metanet graph structure paths.

These paths may be more simply expressed as part of the larger overall path for each key, which is written as:

m/p/b/ . . . / . . . =master root/function root/structure root/ . . . / . . .

The path elements following the m/p/b components will be identical for all keys associated with a given Metanet transaction. This means that a Metanet transaction will be signed with a key $P_{parent}$, have data encrypted with the keys ek and have a funding transaction signed with the key $P_{Funding}$, where all keys share the common path sub-structure (/ . . . / . . . ) that follows their respective Metanet structure root.

Figure 9:
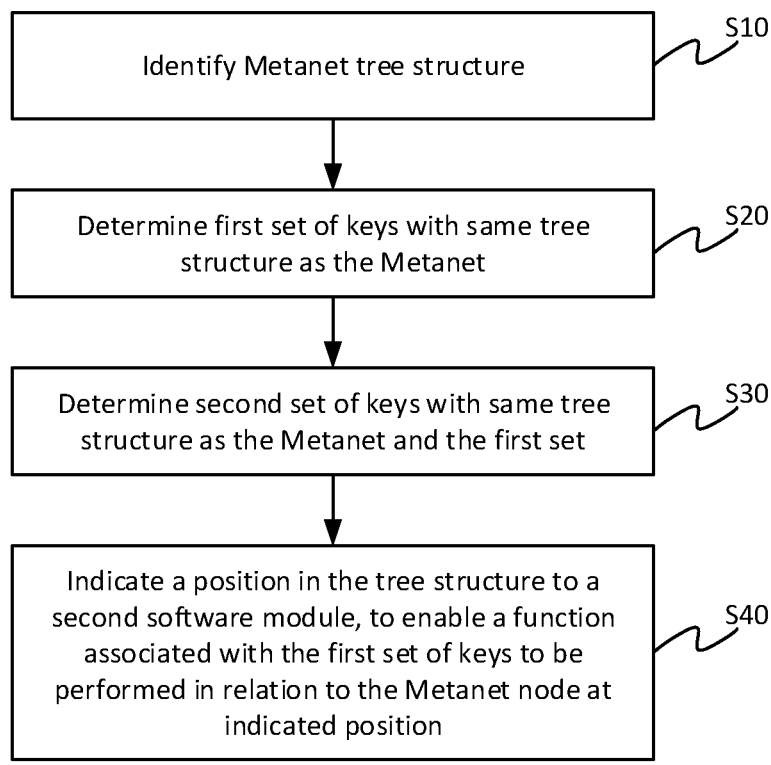
FIG. 9 is a schematic flow chart of a method performed by a first computer equipment.

FIG. 9 is a flow chart of a method that may be performed by the first software module 810. At step S10 the first software module identifies the Metanet tree structure 300. At step S20 the first software module 810 determines a first set of keys, based on a first seed (e.g. 601W), with same tree structure as the Metanet. At step S30 it determines second set of keys, based on a second seed (e.g. 601E), with same tree structure as the Metanet and the first key set. Preferably the first and second seeds are derived from the same master seed (e.g. 601M). At step S40 the first software module 810 sends a communication 815 to the second software module 820, indicating a position in the tree structure of a Metanet node 301, to enable the second module 820 to perform a function associated with the first set of keys in relation to the Metanet node 301 at indicated position. This communication 815 may optionally include the form of CKD function used to derive the first key set and/or the first seed. Alternatively these could be pre-known to the second software module 820. Either way, the communication 815 from the first software module 810 to the second software module 820 does not include the second seed (nor the master seed).

Figure 10:
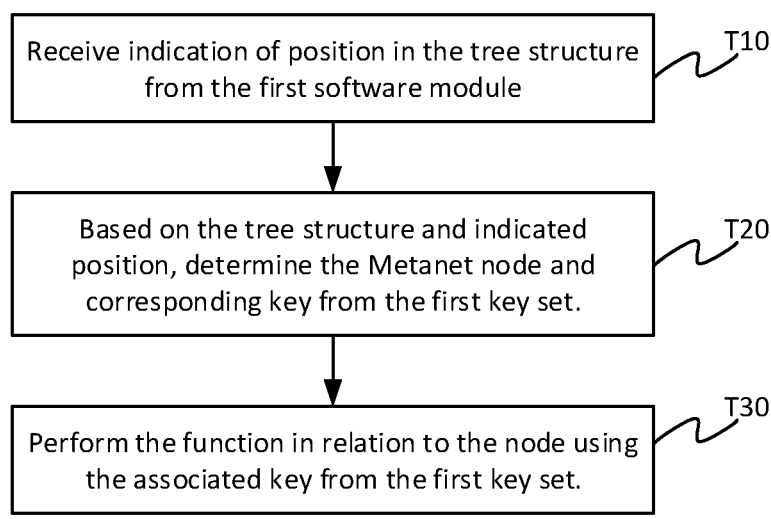
FIG. 10 is a schematic flow chart of a method performed by a second computer equipment.

FIG. 10 is a flow chart illustrating a method that may be performed by the second software module 820. At step T10, the second software module 820 receives the indication of the node position in the tree structure from the first software module 810. At step T20, based on the indicated position knowledge of the tree structure (and CKD function and first seed), the second software module 820 determines the Metanet node and corresponding key from the first key set. At step T30, it can then perform the relevant function in relation to the indicated node 301 based on the derived first key. However it cannot perform the second function as it cannot derive the corresponding second key.

The concept of functional key domains presented herein may be used to provide any one or more of the following advantages or similar.

The creation of transactions can be modularized and split into multiple functions, which can, in turn, be distributed amongst multiple different actors, services or machines. This enables transaction-construction to be made more efficient, as each component can be created as a microservices and optimised independently of each other component, and in such a way that no component needs to have information about any other component to operate, which also has the effect of increasing the scalability of the system.

In a multi-component transaction creation system, this method ensures that no one component can compromise the keys of any other component if itself becomes compromised, because each component only ever has access to keys within its own functional domain branch.

In cases where there are multiple encryption keys, $ek_1$, $ek_e$, ..., $ek_n$, this scheme allows to implement granular permissioning and access control to data that has been operated on by multiple layers or functions of encryption. This can be used to create a complex access control framework (ACF) for on-chain Metanet data.

All functional domain branches stem from the same single source of entropy, which allows the security of all components in a transaction-building system to be handled by a single, highly secure component that has sole access to the master key (mk). This allows security to be bespoke and concentrated into a single component of a multi-component system, which may help to optimise how the system is constructed as a whole.

Child Key Derivation, CKD, Functions

The following gives an example of a known CKD function. It will be appreciated that this is not limiting and other CKDs are also known to a person skilled in the art.

In the terminology adopted earlier, the top key in a given key set was referred to as the 'seed', and multiple such seeds may be derived from a 'master seed' in the overall hierarchy. In an alternative terminology the local 'seed' of a given set may be referred to as the "extended" key (whether a public or private key), and the master seed may be referred to as the 'entropy'.

A process of creating a master key may be written as follows:
  Generating a random sequence D of bits (e.g. of 256 bits) from a secure pseudo-random number generator, which will act as the 'wallet seed';
  Performing a function F (e.g. HMAC-SHA512) on the random bit sequence; and
  Assign the wallet parameters as:
    A master secret key:=left 256 bits of F(D); and
    A master chain code:=right 256 bits of F(D).

The master secret key is a master private key for the wallet, which will generally comprise private-public key pairs in a hierarchy.

Additional entropy, known as 'chain codes' may be used throughout an HD wallet to ensure that knowledge of a given parent key is insufficient on its own to generate its child keys. The chain code is generated deterministically throughout the key hierarchy of an HD wallet, using the 'master chain code' generated here as the initial chain code in the deterministic sequence of all chain codes for that wallet.

A system for abstracting the entropy required for master keys into mnemonic phrases, such that they can be more easily remembered and manipulated by humans, was outlined in BIP39 and has since become a standard technique used in cryptocurrency wallets.

Extended Keys: as mentioned previously, an HD wallet requires knowledge of keys plus additional entropy units, known as chain codes, in order to derive child keys. The concept of an 'extended' key may therefore be used to represent a given key concatenated with its corresponding chain code. These may be written as:

$EPriv:=(privkey, chain\ code)$ $EPub:=(pubkey, chain\ code)$ for extended private and public keys respectively. These extended private and public keys may be used to generate derived child keys using well-known, public child key derivation functions.

Child key derivation (CKD) functions: example child key derivation (CKD) functions are defined in BIP32 and allow a given parent private key or parent public key to be used to derive a child private key or child public key respectively, which can be written as:

$EPriv_{Child,i} := CKD_{Priv}(EPriv_{Parent}, i)$ $EPub_{Child,i} := CKD_{Pub}(EPub_{Parent}, i)$ where i is a 32-byte index value for the index of a child key amongst its siblings. Full definitions of these functions can be found in BIP32. Note that, given a private key (parent or child) it is also trivial to generate the corresponding public key (parent or child) by simple application of elliptic curve multiplication or the like. This fact means that, in general, it is possible to derive both child public and private keys from a given parent private key, whereas it is only possible to derive a child public key from a given parent public key.

It is also notable that it is only ever possible to traverse the key tree of an HD wallet going downwards, deterministically, and never upwards. It is also possible to limit the ability to go downwards in the case of extended public keys by a process known as hardening.

Hardened Keys: in BIP 32, the option to generated HD wallets using hardened keys. These keys remove the ability to generate hardened extended child public keys from extended parent public keys, which is achieved through extending the definition of the CKD functions for indices greater than $2^{32}-1$.

Multi-account hierarchy: introduced formally in BIP44 is the concept of using different branches and levels of the key hierarchy in an HD wallet for different accounts relating to the use of cryptocurrency. However, in all cases the different 'accounts' define keys for substantively the same purpose, that of spending cryptocurrency by signing transactions.

Hierarchical Deterministic Wallets

Figure 11:
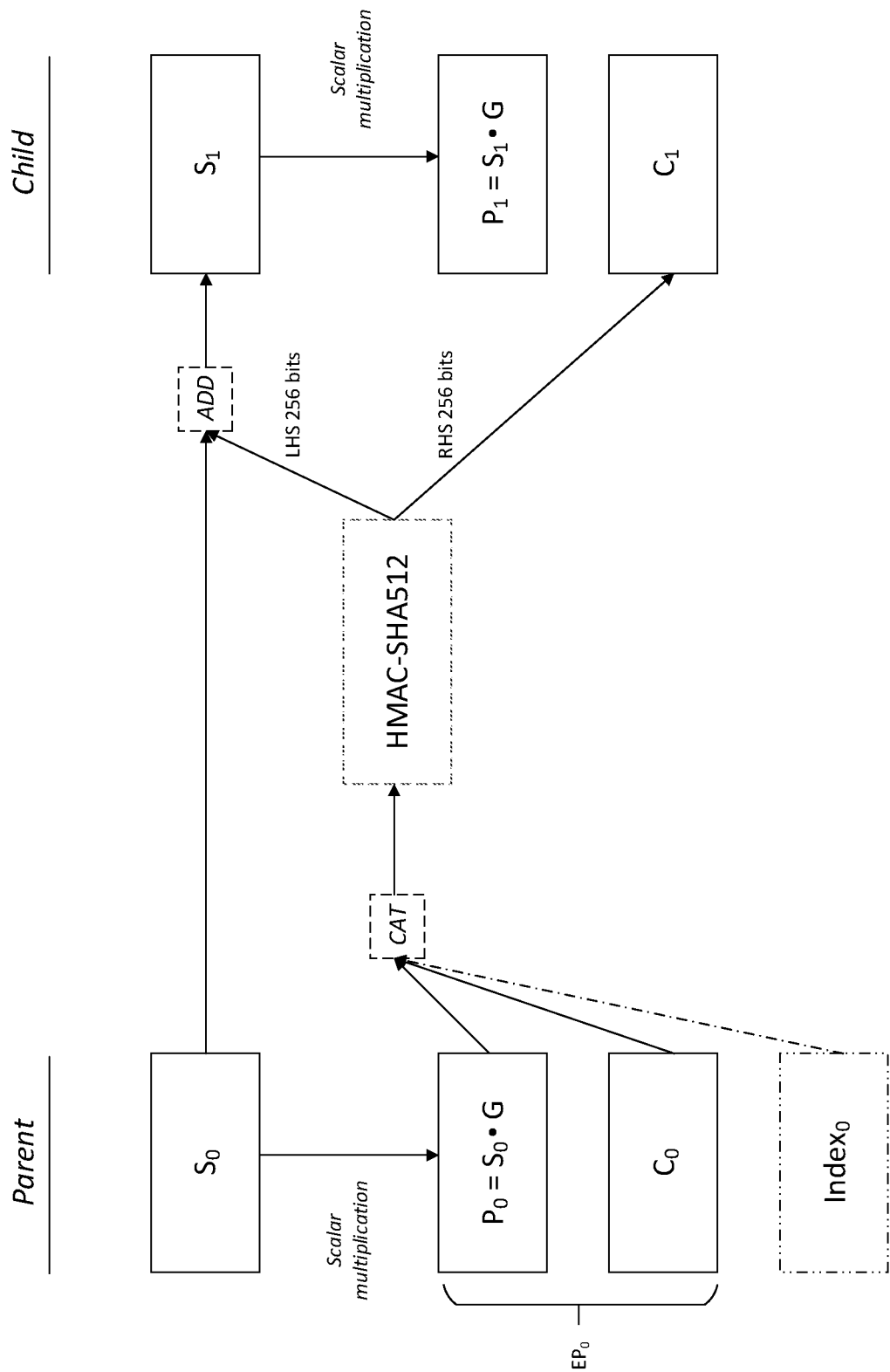
FIG. 11 schematically illustrates a mechanism for generating child private and public keys from parents in the HD-wallet framework.

The following now describes some further discussion of a hierarchical deterministic wallets in the context of certain embodiments that employ elliptic curve cryptography. Reference is made to FIG. 11.

The homomorphic property of EC point multiplication has consequences for HD wallets. It allows to successively construct child public keys $P_{child}$ from a parent public key $P_{parent}$ without ever knowing or storing the corresponding child public keys $S_{child}$.

FIG. 11 shows how a child key-pair is constructed from operations on a parent keypair in a hierarchical deterministic (HD) wallet.

FIG. 11 shows an example mechanism for generating child private and public keys from parents in an HD-wallet framework.

This can be done using either an extended private key or extended public key, which are defined respectively as $ES_{parent} := (S_{Parent} \| C_{parent})$ $EP_{parent} := (P_{Parent} \| C_{parent})$ where C is a random entropy component known as a chain code. There is an additional index assigned to each key at a given level in the hierarchy to distinguish sibling keys from each other. This index has been omitted from the diagram but is normally used as part of the HMAC-SHA512 preimage.

Case 1: Using extended private key. Given an extended private key $ES_{parent}$ we can construct both the private key $S_{child}$ and public key $P_{child}$ of a child keypair. According to the diagram, these are both defined and calculated as $$S_{child} := S_{parent} + LHS[H(P_{parent}\|C_{parent})],$$

$$P_{child} := \{S_{parent} \, LHS[H(P_{parent}\|C_{parent})]\} \cdot G.$$

Here H denotes a cryptographic hash function (e.g. HMAC-SHA512) and LHS denotes the left-most 256-bits of the 512-bit output of H.

Here we have been able to calculate both parts of the child key pair given the extended parent private key and using the process outlined in the diagram.

Case 2: Using extended public key. Given an extended public key $EP_{parent}$ we can construct only the public key $P_{child}$ as $$P_{child} = P_{parent} \oplus \{LHS[H(P_{parent}\|C_{parent})] \cdot G\}.$$

The derivation for this result relies on the homomorphic property of elliptic curve private-public key pairs. The derivation is as follows:

$$P_{child} = S_{child} \cdot G \qquad (*)$$

$$S_{child} := \underbrace{S_{parent}}_{unknown} + LHS[H(P_{parent}\|C_{parent})] \qquad (**)$$

$$P_{child} = \{S_{parent} + LHS[H(P_{parent}\|C_{parent})]\} \cdot G \quad (*) \text{ into } (**)$$

$$= \{S_{parent} \cdot G\} \oplus \{LHS[H(P_{parent}\|C_{parent})] \cdot G\} \text{ by homomorphic property.}$$

$$= \underbrace{P_{parent}}_{unknown} \oplus \{LHS[H(P_{parent}\|C_{parent})] \cdot G\}$$

We see that it is not possible to derive the corresponding private key $S_{child}$ for this public key given only the extended public key $EP_{parent} := (P_{Parent}\|C_{parent})$ of its parent because we require $S_{parent}$. The reason for this can be seen in the diagram as we must add the parent private key to the deterministic part given by the left-most digits of the output of H.

The only other way to find $S_{child}$ would be to 'invert' the elliptic curve point multiplication algorithm, which is currently an intractable problem.

Generating child public keys without ever needing to see, know or store the corresponding private key is advantageous as it reduces storage requirements and can be used for much more secure wallet implementations where the private keys do not need to be stored in order to generate blockchain addresses for receiving payment.

This effect is a direct consequence of the homomorhpism of EC point multiplication and a fundamental property of ECC keypairs.

Figure 12:
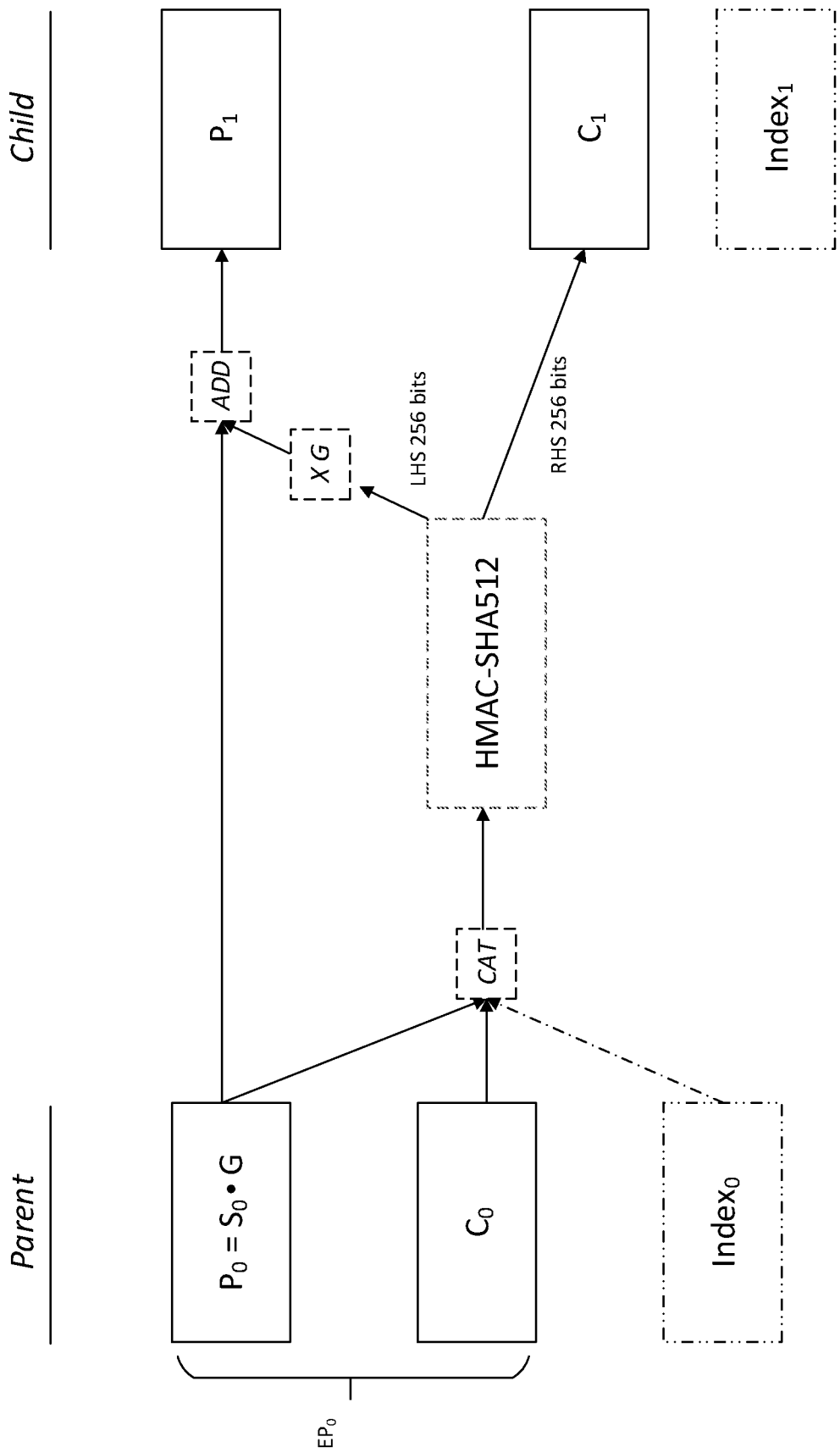
FIG. 12 schematically illustrates a mechanism for generating child public keys from extended parent public keys.

For completeness FIG. 12 shows an example of how child public keys can be generated from extended public keys.

CONCLUSION

It will be appreciated that the above embodiments have been described by way of example only.

For instance, in the above examples it has been described that the overlay-layer links are defined in the payloads of the Metanet transactions (e.g. by means of $TxID_{parent}$ in the output of $TxID_{node}$ in the example of FIG. 4). However this is not essential. In alternative embodiments the graph structure need not actually be declared on-chain, or at least not entirely so. For instance, there may be provided a variant on Metanet where some data structure is stored on the blockchain but the overlay-layer links may be stored off-chain. The hierarchy of keys signing inputs of the data storage transactions would still be enough to recover (the majority of) the data structure, but only to somebody who knows the seed, i.e. not the general public viewing the blockchain, so this would improve privacy. In further variants, the graph structure of the Metanet (or other such overlay network) could be defined entirely off-chain, with only the data content stored on-chain.

Further, whilst the above has been described in terms of a tree structure, more generally the same principles can be applied to any graph structure. E.g. a given node 301 could have two parents. In this case the corresponding key would be derived from two parent keys.

More generally, there may be provided a method, apparatus or program in accordance with any one or more of the following Statements.

Statement 1: a method of managing an overlay network overlaid on data-storage transactions of a blockchain, whereby data content of the overlay network is stored in payloads of the data-storage transactions and overlay-layer links are defined between the data-storage transactions; the method comprising, by a first software module run on first computer equipment:

identifying a graph structure of the overlay network, the graph structure comprising a plurality of nodes and edges between nodes, wherein each of the nodes corresponds to a different respective one of the data-storage transactions and each of the edges corresponds to a different respective one of the links, wherein and each node is associated with a respective first key for signing an input of a child data-storage transaction in the graph structure of the overlay network in order to authorise writing the child to the blockchain, the first keys being generated from a first seed; and using a child key derivation, CKD, function applied to a second seed in order to determine a hierarchical set of second keys having the same graph structure as the overlay network, each second key corresponding to a different respective one of the nodes at a same position in the graph structure as the respective data-storage transaction, wherein the second keys are not used to sign inputs of the data-storage transactions but instead are provided to enable an additional function.

Said graph structure of the overlay network may be a structure of part or all of the overlay network.

Each key may comprise the private key of a public-private key pair, or the public key of a public-private key pair, or both.

Note also: where it is said that the hierarchical key set is derived by applying a CKD to the parent or seed, this does not necessarily imply that the only input to the CKD has to be the parent key or seed (whether the public or private parent key). For instance in embodiments the CKD may also take chain code and/or an index value as an input parameter.

Statement 2: the method of Statement 1, further comprising:

using a CKD function applied to the first seed in order to determine the first keys as keys of a hierarchical key set having the same graph structure as the overlay network and the second key set, each first key corresponding to a different respective one of the nodes at a same position in the graph structure as the respective node.

Statement 3: The method of Statement 1 or 2, further comprising:

from the first software module, communicating an indication of one of the positions in the graph structure to a second software module, thus enabling the second software module to determine the respective first key for the node at that position based on the communicated position, and on the first seed and the CKD function used for the first keys.

Statement 4: The method of Statement 3, wherein the first seed is also communicated to the second software module, said determination by the second module being based on the first seed as communicated to the second module.

This could be communicated from the first software module or a third software module, e.g. which is run on a separate third-party computer equipment, or which is run on the same equipment as the first or second software modules but isolated from the first and second modules.

Statement 5: the method of Statement 3, wherein the first seed is pre-known to the second software module, the determination by the second module being based on the pre-knowledge of the first seed.

Statement 6: the method of Statement 3, 4 or 5, wherein an indication of the CKD function used for the first keys is also communicated to the second software module, said determination by the second module being based on the CKD function as indicated by the first software module.

Again this could be communicated from the first software module or a third software module, e.g. which is run on a separate third-party computer equipment, or which is run on the same equipment as the first or second software modules but isolated from the first and second modules.

Statement 7: the method of Statement 3, 4 or 5, wherein the CKD function is pre-known to the second software module, the determination by the second module being based on the pre-knowledge of the CKD function.

Statement 8: the method of any preceding Statement, wherein each of the first keys authorises writing of the respective child data-storage transaction to the blockchain.

Statement 9: the method of any preceding Statement, wherein each of one or more of the data-storage transactions comprises a respective input pointing to a respective funding output of another transaction, wherein the respective input comprises a respective unlocking script, and wherein the respective locking script requires a cryptographic signature based on the first key of a respective parent data-storage transaction in the overlay graph structure to be included in the respective unlocking script in order to validate the respective data-storage transaction for recordal on the blockchain.

Statement 10: the method of Statement 9, wherein each respective funding output is an output of a respective funding transaction other than the respective parent data-storage transaction.

Statement 11: the method of Statement 10, wherein the input of each funding transaction includes a cryptographic signature based on a respective funding key in order to have the funding transaction validated for recordal on the blockchain, and wherein the output of the respective funding transaction specifies an amount of a digital asset to fund recordal of the respective data-storage transaction on the blockchain.

Statement 12: the method of any preceding Statement, wherein each of said links is a link between a child and a parent one of said data-storage transactions, and the link is formed at the overlay layer by: inclusion of a respective transaction ID of the parent in the payload of the child.

For instance the transaction ID of the parent may be included in an unspendable output of the respective child data-storage transaction. In embodiments such an output may be made unspendable by including an opcode in a locking script which terminates the script. E.g. this would be the OP_RETURN opcode in the Script language.

Statement 13: the method of any preceding claim, wherein the second software module is not given access to the second seed.

Statement 14: the method of any preceding Statement, wherein the second keys are obfuscation keys and said additional function comprises obfuscating and/or de-obfuscating data content of the respective data-storage transactions of the respective nodes.

Statement 15: the method of Statement 14, wherein the obfuscation keys are encryption keys and said additional function comprises encrypting and/or decrypting data content of the respective data-storage transactions of the respective nodes.

Statement 16: the method of any of Statements 1 to 13, wherein the second keys are funding keys and said additional function comprises funding the respective data-storage transactions of the respective nodes to be recorded on the blockchain.

Statement 17: the method of any of Statements 1 to 13, wherein the second keys are application layer keys and said additional function comprises an application layer function to be performed in association with the respective data-storage transactions of the respective nodes.

For instance each of the second keys may be a different respective application-layer serial number of the respective data-storing transaction of the respective node, e.g. use for idempotency purposes.

Statement 18: the method of any preceding Statement, further comprising:
  using a CKD algorithm applied to a third seed in order to determine a hierarchical set of third keys having the same graph structure as the overlay network and set of second keys, each third key corresponding to a different respective one of the nodes at a same position in the graph structure as the respective node, the third keys being for enabling a third function.

Statement 19: the method of any preceding Statement, wherein at least the first seed and second seed are derived from a same master seed.

Statement 20: the method of any preceding Statement, wherein the second software module is run on second computer equipment separate to the first computer equipment.

Statement 21: The method of Statement 20, wherein the first computer equipment is computer equipment of a first party and the second computer equipment is computer equipment of a second party separate to the first party.

Statement 22: the method of Statement 21, wherein the method is used by the first party to commission the second party to have one or more of the data storage transactions recorded on the blockchain without revealing the second keys to the second party.

Statement 23: the method of Statement 22 as dependent on Statement 14 or 15, wherein the method is used by the first party to commission the second party to have one or more of the data storage transactions recorded on the blockchain without enabling the second party to de-obfuscate the data content stored therein.

Statement 24: the method of any of Statements 1 to 19, wherein the second software module is run on the same, first computer equipment as the first software module.

For instance this may be used to prevent the second keys from being compromised if the first software module becomes broken or hacked, and thereby keep the functionality of the first module isolated from the second.

Statement 25: the method of any preceding claim, wherein the data content is stored in an unspendable output of one or more of the data-storage transactions.

For instance, such an output may be made unspendable by including an opcode in a locking script which terminates the script. E.g. this would be the OP_RETURN opcode in the Script language.

Statement 26: the method of any preceding claim, wherein the overlay-layer links are stored amongst the payloads of the data-storage transactions.

Statement 27: the method of any preceding claim, wherein the graph structure is a tree structure.

Statement 28: a computer program product comprising code embodied on computer-readable storage and configured so as when run to perform operations in accordance with the method of any preceding statement.

Statement 29: computer equipment comprising:
memory comprising one or more memory units, and
processing apparatus comprising one or more processing units;
wherein the memory stores a first software module arranged to run on the one or more processing units, and configured so as when run to perform the method of any of Statements 1 to 27.

Statement 30: a method comprising, by a second software module:
receiving from a first software module an indication of a position of a node in a graph structure representing an overlay network, wherein data content of the overlay network is stored in payloads of the data-storage transactions on a blockchain and overlay-layer links are defined between the data-storage transactions, and wherein the graph structure comprises a plurality of nodes and edges between nodes, each of the nodes corresponding to a different respective one of the data-storage transactions and each of the edges corresponding to a different respective one of the links;
using the indicated position to determine a key from amongst a hierarchical set of first keys, the hierarchical set of keys having the same graph structure as the overlay network, each first key corresponding to a different respective one of the nodes at a same position in the graph structure as the respective data-storage transaction, wherein said determining comprises determining the respective key for the node at the indicated position based on that position, and on the seed and the CKD function used for said set keys; and using the determined key to perform a function in relation to the respective data-storage transaction other than signing an input of that data-storage transaction.

Statement 31: a computer program product comprising code embodied on computer-readable storage and configured so as when run to perform operations in accordance with the method of Statement 30.

Statement 32: computer equipment comprising:
memory comprising one or more memory units, and
processing apparatus comprising one or more processing units;
wherein the memory stores a second software module arranged to run on the one or more processing units, and configured so as when run to perform the method of Statement 30.

According to another aspect disclosed herein, there may be provided a method comprising the operations of both the first and second software modules.

According to another aspect disclosed herein there may be provided a computer program product, embodied on computer-readable storage, comprising both the first and second software modules.

According to another aspect disclosed herein, there may be provided a system comprising the first and second computer equipment.

Other variants or use cases of the disclosed techniques may become apparent to the person skilled in the art once given the disclosure herein. The scope of the disclosure is not limited by the described embodiments but only by the accompanying claims.

The invention claimed is:

1. A method of managing an overlay network overlaid on data-storage transactions of a blockchain, whereby data content of the overlay network is stored in payloads of the data-storage transactions and overlay-layer links are defined between the data-storage transactions, the method comprising, by a first software module run on first computer equipment:
identifying a graph structure of the overlay network, the graph structure comprising a plurality of nodes and edges between nodes, wherein each of the nodes corresponds to a different respective one of the data-storage transactions and each of the edges corresponds to a different respective one of the links, and wherein each node is associated with a respective first key for signing an input of a child data-storage transaction in the graph structure of the overlay network in order to authorize writing the child data-storage transaction to the blockchain, the first keys being generated from a first seed; and
using a child key derivation (CKD) function applied to a second seed in order to determine a hierarchical set of second keys having the same graph structure as the overlay network, each second key corresponding to a different respective one of the nodes at a same position in the graph structure as the respective data-storage transaction, wherein the second keys are not used to sign inputs of the data-storage transactions but instead are provided to enable an additional function.

2. The method of claim 1, further comprising:
using a CKD function applied to the first seed in order to determine the first keys as keys of a hierarchical key set having the same graph structure as the overlay network and the second key set, each first key corresponding to a different respective one of the nodes at a same position in the graph structure as the respective node.

3. The method of claim 1, further comprising:
from the first software module, communicating an indication of one of the positions in the graph structure to a second software module, thus enabling the second software module to determine the respective first key for the node at that position based on the communicated position, and on the first seed and the CKD function used for the first keys.

4. The method of claim 1, wherein the second software module is not given access to the second seed.

5. The method of claim 1, wherein the second keys are obfuscation keys and said additional function comprises obfuscating and/or de-obfuscating data content of the respective data-storage transactions of the respective nodes.

6. The method of claim 1, wherein the second keys are funding keys and said additional function comprises funding the respective data-storage transactions of the respective nodes to be recorded on the blockchain.

7. The method of claim 1, wherein the second keys are application layer keys and said additional function comprises an application layer function to be performed in association with the respective data-storage transactions of the respective nodes.

8. The method of claim 1, further comprising:
using a CKD algorithm applied to a third seed in order to determine a hierarchical set of third keys having the same graph structure as the overlay network and set of second keys, each third key corresponding to a different respective one of the nodes at a same position in the graph structure as the respective node, the third keys being for enabling a third function.

9. The method of claim 1, wherein at least the first seed and second seed are derived from a same master seed.

10. The method of claim 1, wherein the second software module is run on second computer equipment separate to the first computer equipment.

11. The method of claim 10, wherein the first computer equipment is computer equipment of a first party and the second computer equipment is computer equipment of a second party separate to the first party.

12. The method of claim 11, wherein the method is used by the first party to commission the second party to have one or more of the data storage transactions recorded on the blockchain without revealing the second keys to the second party.

13. The method of claim 12, wherein;
the second keys are obfuscation keys and said additional function comprises obfuscating and/or de-obfuscating data content of the respective data-storage transactions of the respective nodes; and
the method is used by the first party to commission the second party to have one or more of the data storage transactions recorded on the blockchain without enabling the second party to de-obfuscate the data content stored therein.

14. The method of claim 1, wherein the second software module is run on the same, first computer equipment as the first software module.

15. The method of claim 1, wherein the data content is stored in an unspendable output of one or more of the data-storage transactions.

16. The method of claim 1, wherein the overlay-layer links are stored amongst the payloads of the data-storage transactions.

17. The method of claim 1, wherein the graph structure is a tree structure.

18. A computer program product, comprising a non-transitory computer readable medium including computer program code that, when executed by a first computer equipment, causes the first computer equipment to perform a method for managing an overlay network overlaid on data-storage transactions of a blockchain, whereby data content of the overlay network is stored in payloads of the data-storage transactions and overlay-layer links are defined between the data-storage transactions the method comprising the steps of:
identifying a graph structure of the overlay network, the graph structure comprising a plurality of nodes and edges between nodes, wherein each of the nodes corresponds to a different respective one of the data-storage transactions and each of the edges corresponds to a different respective one of the links, and wherein each node is associated with a respective first key for signing an input of a child data-storage transaction in the graph structure of the overlay network in order to authorize writing the child data-storage transaction to the blockchain, the first keys being generated from a first seed; and
using a child key derivation (CKD) function applied to a second seed in order to determine a hierarchical set of second keys having the same graph structure as the overlay network, each second key corresponding to a different respective one of the nodes at a same position in the graph structure as the respective data-storage transaction, wherein the second keys are not used to sign inputs of the data-storage transactions but instead are provided to enable an additional function.

19. Computer equipment for managing an overlay network overlaid on data-storage transactions of a blockchain, whereby data content of the overlay network is stored in payloads of the data-storage transactions and overlay-layer links are defined between the data-storage transactions, the computer equipment comprising:
memory comprising one or more memory units, and
processing apparatus comprising one or more processing units;
wherein the memory stores a first software module arranged to run on the one or more processing units, wherein the first software module is configured so as when run on the one or more processing units, the one or more processing units perform a method comprising:
identifying a graph structure of the overlay network, the graph structure comprising a plurality of nodes and edges between nodes, wherein each of the nodes corresponds to a different respective one of the data-storage transactions and each of the edges corresponds to a different respective one of the links, and wherein each node is associated with a respective first key for signing an input of a child data-storage transaction in the graph structure of the overlay network in order to authorize writing the child data-storage transaction to the blockchain, the first keys being generated from a first seed; and
using a child key derivation (CKD) function applied to a second seed in order to determine a hierarchical set of second keys having the same graph structure as the overlay network, each second key corresponding to a different respective one of the nodes at a same position in the graph structure as the respective data-storage transaction, wherein the second keys are not used to sign inputs of the data-storage transactions but instead are provided to enable an additional function.

20. A computer program product, comprising code embodied on a non-transitory computer-readable storage medium, the code comprising a second software module configured so as when run to perform operations of:
receiving from a first software module an indication of a position of a node in a graph structure representing an overlay network, wherein data content of the overlay network is stored in payloads of the data-storage transactions on a blockchain and overlay-layer links are defined between the data-storage transactions, and wherein the graph structure comprises a plurality of nodes and edges between nodes, each of the nodes corresponding to a different respective one of the data-storage transactions and each of the edges corresponding to a different respective one of the links;
using the indicated position to determine a key from amongst a hierarchical set of first keys, the hierarchical set of keys having the same graph structure as the overlay network, each first key corresponding to a different respective one of the nodes at a same position in the graph structure as the respective data-storage transaction, wherein said determining comprises determining the respective key for the node at the indicated position based on that position, and on a seed and a CKD function used for said set keys; and using the determined key to perform a function in relation to the respective data-storage transaction other than signing an input of that data-storage transaction.

* * * * *